United States Patent
Shibuya

(10) Patent No.: US 9,154,960 B2
(45) Date of Patent: Oct. 6, 2015

(54) WIRELESS COMMUNICATION NETWORK CONSTRUCTION TERMINAL, WIRELESS COMMUNICATION NETWORK PARTICIPATION TERMINAL, WIRELESS COMMUNICATION SYSTEM, AND WIRELESS COMMUNICATION METHOD

(71) Applicant: Olympus Corporation, Shibuya-ku, Tokyo (JP)

(72) Inventor: Kazuyuki Shibuya, Sagamihara (JP)

(73) Assignee: Olympus Corporation, Tokyo (JP)

( * ) Notice: Subject to any disclaimer, the term of this patent is extended or adjusted under 35 U.S.C. 154(b) by 13 days.

(21) Appl. No.: 14/229,325

(22) Filed: Mar. 28, 2014

(65) Prior Publication Data
US 2014/0342771 A1 Nov. 20, 2014

(30) Foreign Application Priority Data
May 20, 2013 (JP) .................................. 2013-106451

(51) Int. Cl.
H04W 88/06 (2009.01)
H04W 16/00 (2009.01)

(52) U.S. Cl.
CPC ..................... *H04W 16/00* (2013.01)

(58) Field of Classification Search
CPC .................................................. H04W 16/00
See application file for complete search history.

(56) References Cited

U.S. PATENT DOCUMENTS
2009/0265470 A1* 10/2009 Shen et al. .................... 709/227

FOREIGN PATENT DOCUMENTS
JP 2005-303571 10/2005

OTHER PUBLICATIONS
IEEE 802.11-2012, pp. 71-74, 83-91, 423-426, 434, 435, 478, 1011-1023, 1254-1264 (45 pgs.) (IEEE, New York, NY Mar. 29, 2012).

* cited by examiner

*Primary Examiner* — Kashif Siddiqui
(74) *Attorney, Agent, or Firm* — John C. Pokotylo; Straub & Pokotylo

(57) ABSTRACT

A wireless communication network construction terminal includes: a vibration generating module configured to generate vibration; a wireless communicator; a construction unit configured to construct a wireless communication network; a selector configured to select one of a plurality of wireless communication protocols; a vibration controller configured to cause the vibration generating module to generate vibration indicating a wireless communication protocol selected by the selector; and a communication controller configured, when a communication connection request message corresponding to the wireless communication protocol selected by the selector is wirelessly received by the wireless communicator after an operation in accordance with the wireless communication protocol selected by the selector is started, to cause the wireless communicator to wirelessly transmit a message of permitting a communication connection request to a wireless communication network participation terminal that has wirelessly transmitted the communication connection request message.

15 Claims, 17 Drawing Sheets

WIRELESS COMMUNICATION NETWORK CONSTRUCTION TERMINAL, WIRELESS COMMUNICATION NETWORK PARTICIPATION TERMINAL, WIRELESS COMMUNICATION SYSTEM, AND WIRELESS COMMUNICATION METHOD

BACKGROUND OF THE INVENTION

1. Field of the Invention

The present invention relates to wireless communication which is performed when a wireless communication network participation terminal participates in a wireless communication network such as a wireless local area network (LAN) constructed by a wireless communication network construction terminal. Priority is claimed on Japanese Patent Application No. 2013-106451, filed May 20, 2013, the content of which is incorporated herein by reference.

2. Description of Related Art

In recent years, wireless communication terminals driven by batteries such as mobile telephones, smartphones, tablets, and digital still cameras have become remarkably widespread. In such wireless communication terminals driven by batteries, it is important to reduce power consumption such that driving can be performed for a long period of time.

In the past, as a means of reducing power consumption of a communication terminal, a technique of generating predetermined vibration while both terminals are in contact with each other and starting communication between the terminals when both terminals detect the predetermined vibration has been proposed in Japanese Unexamined Patent Application, First Publication No. 2005-303571.

Meanwhile, when wireless communication is performed via a wireless LAN, a wireless communication network participation terminal needs setting information of a wireless communication network in order to participate in the wireless communication network provided by a wireless communication network construction terminal such as an access point and receive authentication for performing data communication. The setting information of the wireless communication network includes various kinds of information such as a network ID (SSID), an authentication scheme, an encryption scheme, and an encryption key of the wireless communication network.

As a wireless communication protocol used when the wireless communication network participation terminal participates in the wireless communication network and receives authentication using the setting information of the wireless communication network, there are a plurality of wireless communication protocols. The wireless communication network participation terminal can use any one of the plurality of wireless communication protocols. As an example of the wireless communication protocol, there is a scheme of performing a connection process as a wireless communication network participation terminal transmits a communication connection request message for requesting a communication connection to a wireless communication network construction terminal using setting information stored in the wireless communication network participation terminal before a communication start trigger is generated. In this scheme, as a user reads the setting information through a management screen of the wireless communication network construction terminal or the like and inputs the setting information on the wireless communication network participation terminal, the setting information is stored in the wireless communication network participation terminal.

Inputting the setting information of the wireless communication network to the wireless communication network participation terminal is complicated, and it is particularly difficult for a user who is unfamiliar with a wireless LAN technique to input the setting information of the wireless communication network. For this reason, as another wireless communication protocol, a scheme of performing a connection process as a wireless communication network participation terminal acquires setting information of a wireless communication network and transmits a communication connection request message after a communication start trigger is generated while reducing a burden on a user has been widespread. For example, Wi-Fi Protected Setup™ (hereinafter referred to as WPS) is defined as a standard setup in the wireless LAN industry.

SUMMARY OF THE INVENTION

According to a first aspect of the present invention, a wireless communication network construction terminal includes: a vibration generating module configured to generate vibration; a wireless communicator; a construction unit configured to construct a wireless communication network; a selector configured to select one of a plurality of wireless communication protocols; a vibration controller configured to cause the vibration generating module to generate vibration indicating a wireless communication protocol selected by the selector; and a communication controller configured to start an operation in accordance with the wireless communication protocol selected by the selector when the operation has not been started, and, when a communication connection request message corresponding to the wireless communication protocol selected by the selector is wirelessly received by the wireless communicator after the operation is started, to cause the wireless communicator to wirelessly transmit a message of permitting a communication connection request to a wireless communication network participation terminal that has wirelessly transmitted the communication connection request message.

According to a second aspect of the present invention, the wireless communication network construction terminal according to the first aspect may further include a detector configured to detect contact of an external object. The vibration controller may be configured to cause the vibration generating module to generate the vibration indicating the wireless communication protocol selected by the selector when the detector detects the contact.

According to a third aspect of the present invention, the wireless communication network construction terminal according to the second aspect may further include an imager. The vibration controller may be configured to cause the vibration generating module to generate vibration for dropping an object attached to the imager when the detector has not detected the contact.

According to a fourth aspect of the present invention, the wireless communication network construction terminal according to the second aspect may further include a public network interface. The vibration controller may be configured to cause the vibration generating module to generate vibration indicating that a call arrives at the public network interface when the detector has not detected the contact and a call arrives at the public network interface.

According to a fifth aspect of the present invention, in the wireless communication network construction terminal according to the first aspect, the selector may be configured to select a wireless communication protocol different from a previously selected wireless communication protocol when the communication connection request message is not wirelessly received within a predetermined period of time after the vibration generating module generates vibration.

According to a sixth aspect of the present invention, in the wireless communication network construction terminal according to the first aspect, the vibration controller may be configured to cause the vibration generating module to generate vibration indicating the same wireless communication protocol as a wireless communication protocol indicated by previously generated vibration when the communication connection request message is not wirelessly received within a predetermined period of time after the vibration generating module generates vibration.

According to a seventh aspect of the present invention, the wireless communication network construction terminal according to the first aspect may further include a storage unit that stores setting information of the wireless communication network. The vibration controller may be configured to cause the vibration generating module to generate the vibration indicating the wireless communication protocol selected by the selector and vibration corresponding to the setting information stored in the storage unit.

According to an eight aspect of the present invention, a wireless communication network participation terminal includes: a vibration detector configured to detect vibration; a wireless communicator; an information extractor configured to extract information indicating a predetermined wireless communication protocol from vibration detected by the vibration detector; and a communication controller configured to start an operation in accordance with the wireless communication protocol indicated by the information extracted by the information extractor, and to cause the wireless communicator to wirelessly transmit a communication connection request message to a wireless communication network construction terminal in accordance with the wireless communication protocol indicated by the information extracted by the information extractor after the operation is started.

According to a ninth aspect of the present invention, the wireless communication network participation terminal according to the eighth aspect may further include a detector configured to detect contact of an external object. The information extractor may be configured to extract the information indicating the predetermined wireless communication protocol from the vibration detected by the vibration detector when the detector detects the contact.

According to a tenth aspect of the present invention, the wireless communication network participation terminal according to the eighth aspect may further include a detector configured to detect contact of an external object. The information extractor may be configured to extract the information indicating the predetermined wireless communication protocol and information indicating setting information of a wireless communication network from the vibration detected by the vibration detector when the detector detects the contact.

According to an eleventh aspect of the present invention, in the wireless communication network participation terminal according to the eighth aspect, the vibration detector may include a motion sensor.

According to a twelfth aspect of the present invention, a wireless communication system includes: a wireless communication network construction terminal; and a wireless communication network participation terminal. The wireless communication network construction terminal includes: a vibration generating module configured to generate vibration; a first wireless communicator; a construction unit configured to construct a wireless communication network; a selector configured to select one of a plurality of wireless communication protocols; a vibration controller configured to cause the vibration generating module to generate vibration indicating a wireless communication protocol selected by the selector; and a first communication controller configured to start a first operation in accordance with the wireless communication protocol selected by the selector when the first operation has not been started, and, when a communication connection request message corresponding to the wireless communication protocol selected by the selector is wirelessly received by the first wireless communicator after the first operation is started, to cause the first wireless communicator to wirelessly transmit a message of permitting a communication connection request to the wireless communication network participation terminal that has wirelessly transmitted the communication connection request message. The wireless communication network participation terminal includes: a vibration detector configured to detect vibration; a second wireless communicator; an information extractor configured to extract information indicating a wireless communication protocol from vibration detected by the vibration detector; and a second communication controller configured to start a second operation in accordance with the wireless communication protocol indicated by the information extracted by the information extractor, and to cause the second wireless communicator to wirelessly transmit the communication connection request message to the wireless communication network construction terminal in accordance with the wireless communication protocol indicated by the information extracted by the information extractor after the second operation is started.

According to a thirteenth aspect of the present invention, a wireless communication method includes: a constructing step of constructing, by a wireless communication network construction terminal, a wireless communication network; a selecting step of selecting, by the wireless communication network construction terminal, one of a plurality of wireless communication protocols; a vibration generating step of generating, by the wireless communication network construction terminal, vibration indicating a wireless communication protocol selected in the selecting step; a first starting step of starting, by the wireless communication network construction terminal, a first operation in accordance with the wireless communication protocol selected in the selecting step when the first operation has not been started; a vibration detecting step of detecting, by a wireless communication network participation terminal, the vibration; an information extracting step of extracting, by the wireless communication network participation terminal, information indicating a wireless communication protocol from the vibration detected in the vibration detecting step; a second starting step of starting, by the wireless communication network participation terminal, a second operation in accordance with the wireless communication protocol indicated by the information extracted in the information extracting step; a first transmitting step of wirelessly transmitting, by the wireless communication network participation terminal, a communication connection request message to the wireless communication network construction terminal in accordance with the wireless communication protocol indicated by the information extracted in the information extracting step after the second operation is started; and a second transmitting step of wirelessly transmitting, by the wireless communication network construction terminal, a message of permitting a communication connection request to the wireless communication network participation terminal that has wirelessly transmitted the communication connection request message when the communication connection request message corresponding to the wireless communication protocol selected in the selecting step is wirelessly received after the first operation is started.

According to a fourteenth aspect of the present invention, a computer readable recording device has a program stored thereon for causing a computer to execute a method. The method includes: a constructing step of constructing a wireless communication network; a selecting step of selecting one of a plurality of wireless communication protocols; a vibration generating step of causing a vibration generating module to generate vibration indicating a wireless communication protocol selected in the selecting step; a step of starting an operation in accordance with the wireless communication protocol selected in the selecting step when the operation has not been started; and a transmitting step of causing a wireless communicator to wirelessly transmit a message of permitting a communication connection request to a wireless communication network participation terminal that has wirelessly transmitted a communication connection request message corresponding to the wireless communication protocol selected in the selecting step when the communication connection request message is wirelessly received by the wireless communicator after the operation is started.

According to a fifteenth aspect of the present invention, a computer readable recording device has a program stored thereon for causing a computer to execute a method. The method includes: a vibration detecting step of causing a vibration detector to detect vibration; an information extracting step of extracting information indicating a predetermined wireless communication protocol from vibration detected in the vibration detecting step; a step of starting an operation in accordance with the wireless communication protocol indicated by the information extracted in the information extracting step; and a transmitting step of causing a wireless communicator to wirelessly transmit a communication connection request message to a wireless communication network construction terminal in accordance with the wireless communication protocol indicated by the information extracted in the information extracting step after the operation is started.

DETAILED DESCRIPTION OF THE INVENTION

Figure 1:
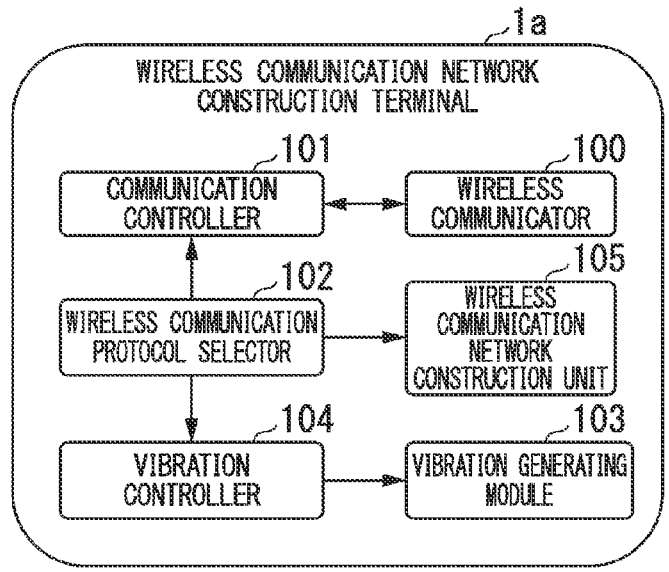
FIG. 1 is a block diagram illustrating the constitution of a wireless communication network construction terminal according to a first embodiment of the present invention.

Hereinafter, exemplary embodiments of the present invention are described with reference to the appended drawings. The following description proceeds with an example of a wireless communication system including a wireless communication network construction terminal serving as a wireless communication terminal that constructs a wireless communication network such as a wireless LAN and a wireless communication network participation terminal serving as a wireless communication terminal that performs a connection process and participates in the wireless communication network constructed by the wireless communication network construction terminal First Embodiment First, a first embodiment of the present invention is described. FIG. 1 illustrates the constitution of a wireless communication network construction terminal according to the present embodiment. A wireless communication network construction terminal 1a illustrated in FIG. 1 includes a wireless communicator (a first wireless communicator) 100, a communication controller (a first communication controller) 101, a wireless communication protocol selector (a selector) 102, a vibration generating module 103, a vibration controller 104, and a wireless communication network construction unit (a construction unit) 105.

The wireless communicator 100 includes a wireless communication module (a wireless communication circuit), and performs wireless communication with another wireless communication terminal (in the case of the present embodiment, a wireless communication network participation terminal). The communication controller 101 controls wireless communication performed by the wireless communicator 100. The wireless communication protocol selector 102 selects any one of a plurality of wireless communication protocols. The selected wireless communication protocol is used in wireless communication with the wireless communication network participation terminal. The vibration generating module 103 generates vibration indicating a predetermined wireless communication protocol.

The vibration controller 104 causes the vibration generating module 103 to generate vibration indicating the wireless communication protocol selected by the wireless communication protocol selector 102. The wireless communication network construction unit 105 constructs a wireless communication network. The wireless communication network is constructed by generating an SSID serving as an identifier of the wireless communication network, and a passphrase serving as an encryption key.

Figure 2:
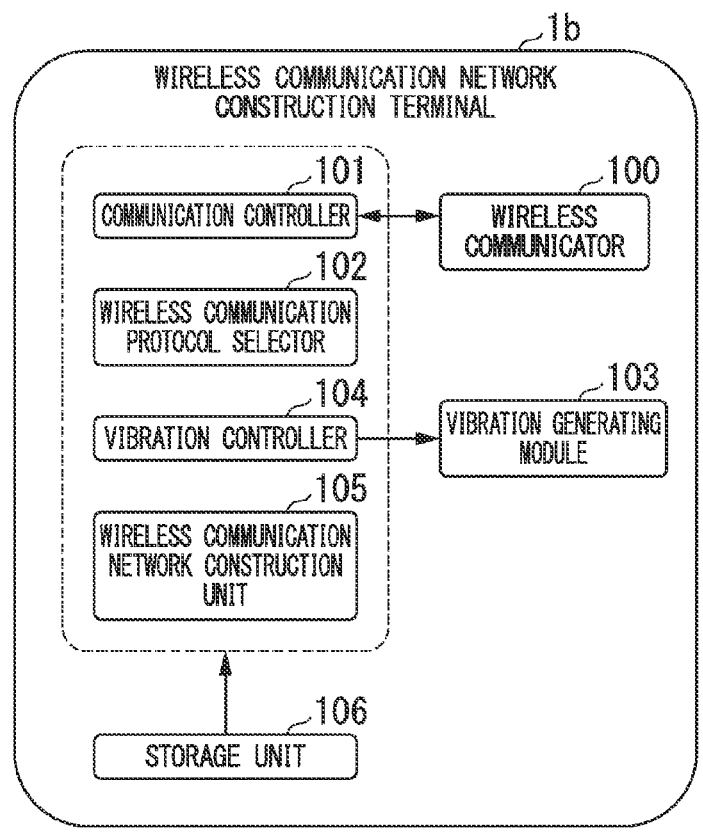
FIG. 2 is a block diagram illustrating the constitution of a wireless communication network construction terminal according to the first embodiment of the present invention.

FIG. 2 illustrates the constitution of a modified example of the wireless communication network construction terminal according to the present embodiment. In FIG. 2, components having the same functions as the components illustrated in FIG. 1 are denoted by the same reference numerals. A wireless communication network construction terminal 1b illustrated in FIG. 2 includes a wireless communicator 100, a communication controller 101, a wireless communication protocol selector 102, a vibration generating module 103, a vibration controller 104, a wireless communication network construction unit 105, and a storage unit 106.

The functions of the communication controller 101, the wireless communication protocol selector 102, the vibration controller 104, and the wireless communication network construction unit 105 are implemented, for example, as functions of software by reading and executing a program stored in the storage unit 106 through a computer (CPU) of the wireless communication network construction terminal 1b. Further, for example, the program may be provided by a "computer readable recording device" such as a flash memory. Further, the program may be input to the wireless communication network construction terminal 1b such that the program is transmitted to the wireless communication network construction terminal 1b from a computer storing the program in a storage device or the like via a transmission medium or a transmission wave in a transmission medium. Here, the "transmission medium" through which the program is transmitted is a medium having a function of transmitting information such as a network (communication network) including the Internet or the like or a communication line (communication wire) including a telephone line or the like. The program may be configured to implement some of the above-mentioned functions. Further, the program may be a so-called differential file (a differential program) which can implement the above-mentioned functions in combination with a program previously stored in a computer.

Figure 3:
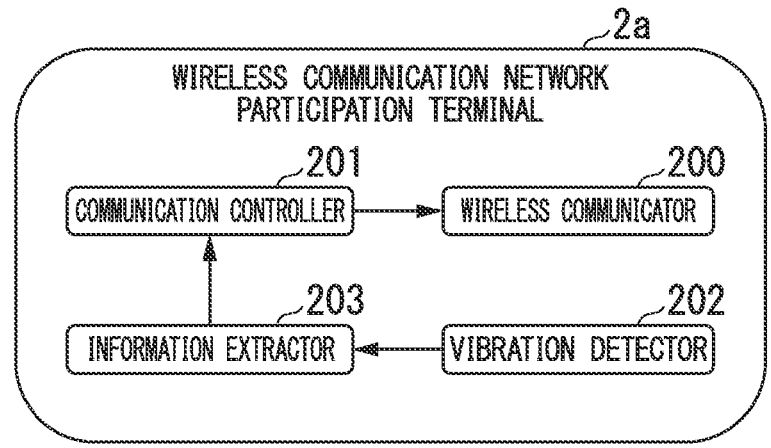
FIG. 3 is a block diagram illustrating the constitution of a wireless communication network participation terminal according to the first embodiment of the present invention.

FIG. 3 illustrates the constitution of a wireless communication network participation terminal according to the present embodiment. A wireless communication network participation terminal 2a illustrated in FIG. 3 includes a wireless communicator (a second wireless communicator) 200, a communication controller (a second communication controller) 201, a vibration detector 202, and an information extractor 203.

The wireless communicator 200 includes a wireless communication module (a wireless communication circuit), and performs wireless communication with another wireless communication terminal (in the case of the present embodiment, the wireless communication network construction terminal). The communication controller 201 controls wireless communication performed by the wireless communicator 200. The vibration detector 202 includes a vibration detection module (a vibration detection circuit), and detects vibration. The information extractor 203 extracts information indicating a predetermined wireless communication protocol from the pattern of the vibration detected by the vibration detector 202.

Figure 4:
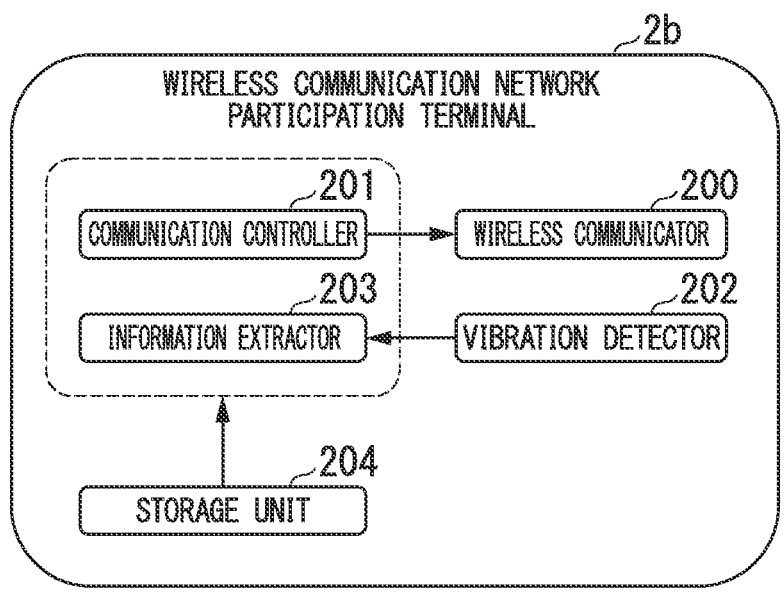
FIG. 4 is a block diagram illustrating the constitution of a wireless communication network participation terminal according to the first embodiment of the present invention.

FIG. 4 illustrates the constitution of a modified example of the wireless communication network participation terminal according to the present embodiment. In FIG. 4, components having the same functions as the components illustrated in FIG. 3 are denoted by the same reference numerals. A wireless communication network participation terminal 2b illustrated in FIG. 4 includes a wireless communicator 200, a communication controller 201, a vibration detector 202, an information extractor 203, and a storage unit 204.

For example, the functions of the communication controller 201 and the information extractor 203 are implemented as functions of software by reading and executing a program stored in the storage unit 204 through a computer (CPU) of the wireless communication network participation terminal 2b. The implementation form of the program is the same as that of the program for implementing the functions of the communication controller 101, the wireless communication protocol selector 102, the vibration controller 104, and the wireless communication network construction unit 105 of the wireless communication network construction terminal 1b.

As described later, in the wireless communication network construction terminal 1a, when an operation (a first operation) in accordance with the wireless communication protocol selected by the wireless communication protocol selector 102 is not started, the communication controller 101 starts the operation. Further, when a communication connection request message corresponding to the wireless communication protocol selected by the wireless communication protocol selector 102 is wirelessly received by the wireless communicator 100 after the operation is started, the communication controller 101 causes the wireless communicator 100 to wirelessly transmit a message of permitting the communication connection request to the wireless communication network participation terminal 2a that has wirelessly transmitted the communication connection request message.

As described later, in the wireless communication network participation terminal 2a, the communication controller 201 starts an operation (a second operation) in accordance with the wireless communication protocol indicated by the information extracted by the information extractor 203. After the operation is started, the communication controller 201 wirelessly transmits the communication connection request message from the wireless communicator 200 to the wireless communication network construction terminal 1a in accordance with the wireless communication protocol indicated by the information extracted by the information extractor 203.

Figure 5:
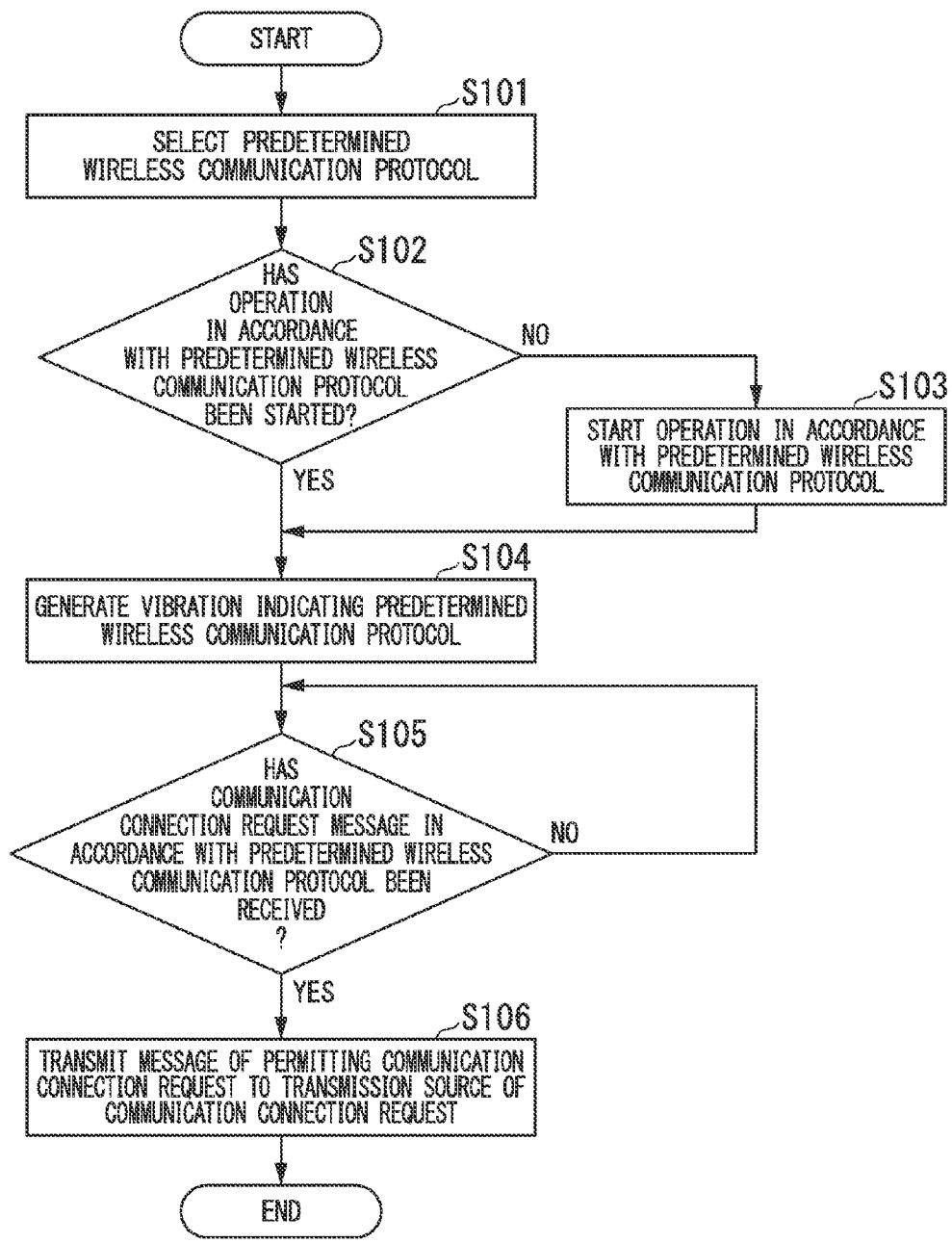
FIG. 5 is a flowchart illustrating an operation procedure of a wireless communication network construction terminal according to the first embodiment of the present invention.

Next, an operation of the wireless communication network construction terminal 1a is described. An operation of the wireless communication network construction terminal 1b is the same as the operation of the wireless communication network construction terminal 1a, and thus the operation of the wireless communication network construction terminal 1a is representatively described. FIG. 5 illustrates the operation of the wireless communication network construction terminal 1a.

First, the wireless communication protocol selector 102 selects a predetermined wireless communication protocol to be used in wireless communication with the wireless communication network participation terminal 2a from among a plurality of wireless communication protocols (step S101). For example, information of a plurality of wireless communication protocols is stored in a storage unit which is not illustrated in FIG. 1, and in step S101, the wireless communication protocol selector 102 selects a predetermined wireless communication protocol from among the plurality of wireless communication protocols stored in the storage unit in accordance with an instruction from a user. For example, the plurality of wireless communication protocols are IEEE 802.11 and WPS. A notification of the information of the wireless communication protocol selected by the wireless communication protocol selector 102 is given to the communication controller 101 and the vibration controller 104.

After the predetermined wireless communication protocol is selected, the communication controller 101 determines whether an operation in accordance with the selected predetermined wireless communication protocol has been started (step S102). For example, when the wireless communication protocol is IEEE 802.11, the operation in accordance with the predetermined wireless communication protocol may be an operation of constructing a wireless communication network, an operation of transmitting a beacon, and an operation of performing various kinds of communication (reception of a probe request, transmission of a probe response, reception of an association request, transmission of an association response, and the like) with the wireless communication network participation terminal. Further, for example, when the wireless communication protocol is the WPS, the operation in accordance with the predetermined wireless communication protocol may be an operation of adding a WSC IE (additional information related to the WPS) to a beacon to be transmitted or a response (a probe response, an association response, or the like) to be transmitted to the wireless communication network participation terminal.

When it is determined that the operation in accordance with the predetermined wireless communication protocol has already started, the process proceeds to step S104 which is described later. For example, there are cases in which the wireless communication network participation terminal 2a has participated in the wireless communication network and performs data communication, and another wireless communication network participation terminal 2a participates in the wireless communication network. In this case, in step S102, the operation in accordance with the predetermined wireless communication protocol is determined to have been started based on collaboration with the wireless communication network participation terminal 2a that has performed data communication first. Further, there are cases in which the wireless communication network participation terminal 2a participates in the wireless communication network, performs data communication, and leaves the wireless communication network, and thereafter, the wireless communication network construction terminal 1a continues the operation in accordance with the predetermined wireless communication protocol without ending the operation. In this case, in step S102 performed when another wireless communication network participation terminal 2a participates in the wireless communication network, the operation in accordance with the predetermined wireless communication protocol is determined to have been started based on collaboration with the wireless communication network participation terminal 2a that has performed data communication first.

Further, when the operation in accordance with the predetermined wireless communication protocol has not been started yet, the communication controller 101 controls the wireless communicator 100 such that the operation in accordance with the predetermined wireless communication protocol is started (step S103). After the operation in accordance with the predetermined wireless communication protocol is started, the vibration controller 104 controls the vibration generating module 103 such that vibration indicating a predetermined wireless communication protocol is generated. The vibration generating module 103 generates the vibration indicating the predetermined wireless communication protocol in accordance with control performed by the vibration controller 104 (step S104).

For example, when the wireless communication protocol is IEEE 802.11, the vibration indicating the predetermined wireless communication protocol is vibration having a pattern generated based on information indicating that a value indicated by the vibration is an SSID of IEEE 802.11, and an SSID value. Further, for example, when the wireless communication protocol is the WPS, the vibration indicating the predetermined wireless communication protocol is vibration having a pattern generated based on information indicating that a value indicated by the vibration is the WPS, and information indicating a WPS scheme (a push button constitution (PBC), a personal identification number (PIN), or any other scheme). Further, the vibration indicating the predetermined wireless communication protocol may be vibration having a pattern generated based on information indicating any other scheme (which may be a unique scheme).

After the vibration is generated, the communication controller 101 monitors wireless communication performed by the wireless communicator 100, and determines whether the communication connection request message in accordance with the predetermined wireless communication protocol has been received (step S105). For example, when the wireless communication protocol is IEEE 802.11, the communication connection request message is an association request including the SSID of the wireless communication network without including the WSC IE. Further, for example, when the wireless communication protocol is the WPS, the communication connection request message is an association request including the WSC IE. In this case, for example, the WSC IE includes additional information such as version information and a role (a role of the wireless communication network participation terminal or a role of a terminal receiving the wireless communication network participation terminal) in the WPS of a terminal that has wirelessly transmitted the communication connection request message.

When it is determined that the communication connection request message has not been received, the communication controller 101 continuously monitors the wireless communication performed by the wireless communicator 100 and determines whether the communication connection request message has been received. When it is determined that the communication connection request message has been received, the communication controller 101 controls the wireless communicator 100 such that a message of permitting the communication connection request is wirelessly transmitted to the wireless communication network participation terminal 2a which is the transmission source of the communication connection request message. Through this operation, the wireless communicator 100 wirelessly transmits the message of permitting the communication connection request to the wireless communication network participation terminal 2a (step S106). For example, the message of permitting the communication connection request is an association response including a status code (=0 (success)).

When the wireless communication protocol is IEEE 802.11, in step S103, the operation in accordance with the wireless communication protocol is started, and then the wireless communication network is constructed. Further, when the wireless communication protocol is the WPS, in step S103, before the operation in accordance with the wireless communication protocol is started, the wireless communication network is constructed. In any other case, in step S103, the wireless communication network may be constructed before the operation in accordance with the wireless communication protocol is started, or the wireless communication network may be constructed until the communication connection request message is received from the wireless communication network participation terminal 2a.

Figure 6:
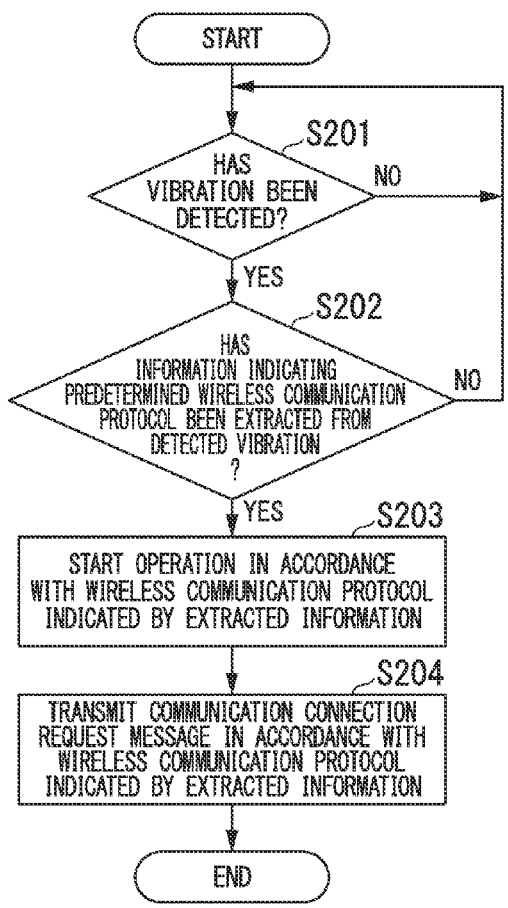
FIG. 6 is a flowchart illustrating an operation procedure of a wireless communication network participation terminal according to the first embodiment of the present invention.

Next, an operation of the wireless communication network participation terminal 2a is described. The operation of the wireless communication network participation terminal 2b is the same as the operation of the wireless communication network participation terminal 2a, and the operation of the wireless communication network participation terminal 2a is representatively described. FIG. 6 illustrates the operation of the wireless communication network participation terminal 2a.

First, the vibration detector 202 monitors vibration, and determines whether vibration has been detected (step S201). For example, when the wireless communication network construction terminal 1a is in contact with the wireless communication network participation terminal 2a, the wireless communication network participation terminal 2a can detect the vibration generated by the wireless communication network construction terminal 1a. When no vibration has been detected, the vibration detector 202 continuously monitors vibration and determines whether vibration has been detected.

When vibration has been detected, the vibration detector 202 notifies the information extractor 203 of information indicating a pattern of the detected vibration. The information extractor 203 performs a process of extracting information indicating a predetermined wireless communication protocol from the information notified of by the vibration detector 202, and determines whether the information has been extracted (step S202). For example, information indicating a predetermined wireless communication protocol is stored in a storage unit which is not illustrated in FIG. 2, the information extractor 203 compares the information notified of by the vibration detector 202 with the information stored in the storage unit, and determines that information indicating a wireless communication protocol corresponding to the information stored in the storage unit has been extracted when both pieces of information are identical to each other.

For example, when vibration indicating IEEE 802.11 is detected, the information extractor 203 extracts information indicating that a value indicated by the vibration is an SSID of IEEE 802.11, and an SSID value. Further, for example, when the wireless communication protocol is the WPS, the information extractor 203 extracts information indicating that a value indicated by the vibration is the WPS, and information indicating a WPS scheme.

When the information has not been extracted, the vibration detector 202 monitors vibration and determines whether vibration has been detected (step S201). Further, when the information has been extracted, the communication controller 201 controls the wireless communicator 200 such that the operation in accordance with the predetermined wireless communication protocol indicated by the information extracted by the information extractor 203 is started (step S203). The operation in accordance with the predetermined wireless communication protocol is the same as the operation described as step S102 in FIG. 5.

After the operation in accordance with the predetermined wireless communication protocol is started, the communication controller 201 controls the wireless communicator 200 such that the wireless communicator 200 generates the communication connection request message in accordance with the predetermined wireless communication protocol, and wirelessly transmits the generated communication connection request message to the wireless communication network construction terminal 1a. Through this operation, the wireless communicator 200 wirelessly transmits the communication connection request message to the wireless communication network construction terminal 1a (step S204).

Figure 7:
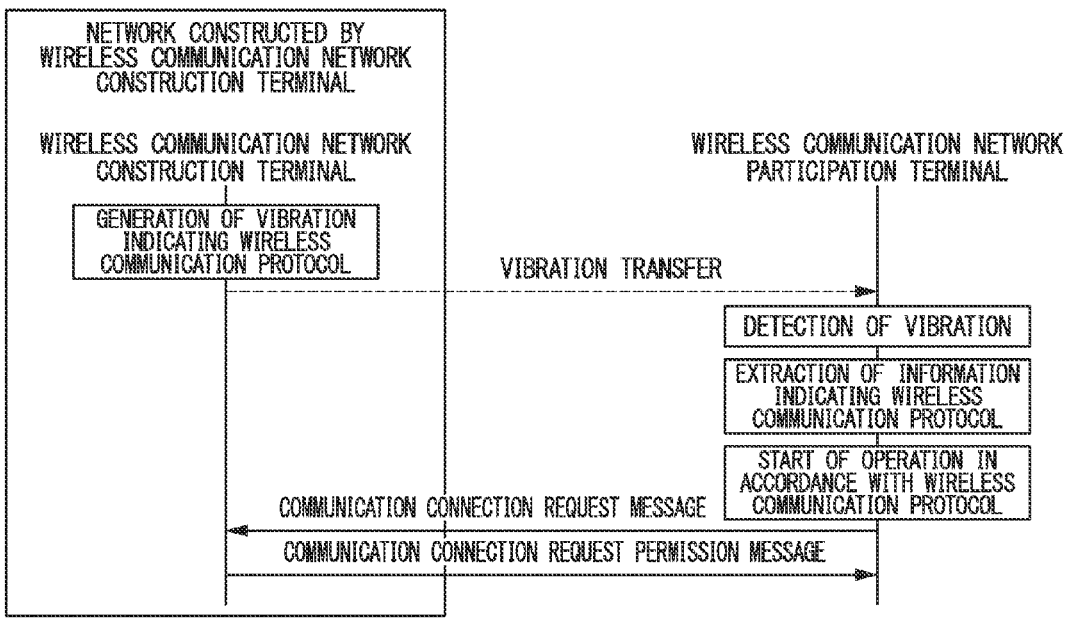
FIG. 7 is a sequence diagram illustrating an operation procedure of the wireless communication network construction terminal and the wireless communication network participation terminal according to the first embodiment of the present invention.

Next, an example of the operation in accordance with FIGS. 5 and 6 is described. FIG. 7 illustrates exemplary operations of the wireless communication network construction terminal 1a and the wireless communication network participation terminal 2a. In the example illustrated in FIG. 7, the wireless communication network construction terminal 1a is in a state in which construction of a wireless communication network is completed, and the operation in accordance with the wireless communication protocol is already started at a point in time at which the operation illustrated in FIG. 7 starts.

When the wireless communication network construction terminal 1a generates vibration indicating a wireless communication protocol (corresponding to step S104), the wireless communication network participation terminal 2a detects the vibration (corresponding to step S201). Then, the wireless communication network participation terminal 2a extracts information indicating a wireless communication protocol from information indicating a pattern of the detected vibration (corresponding to step S202), and starts an operation in accordance with the wireless communication protocol indicated by the extracted information (corresponding to step S203).

Then, the wireless communication network participation terminal 2a wirelessly transmits the communication connection request message in accordance with the wireless communication protocol indicated by the extracted information (corresponding to step S204). The wireless communication network construction terminal 1a wirelessly receives the communication connection request message wirelessly transmitted from the wireless communication network participation terminal 2a (corresponding to step S105), and transmits a message of permitting the communication connection request to the wireless communication network participation terminal 2a (corresponding to step S106).

Next, an example of the operation performed after the operation in accordance with FIGS. 5 and 6 is described. When the wireless communication protocol is IEEE 802.11 and a security function is not set, wireless data communication can be performed between the wireless communication network construction terminal 1a and the wireless communication network participation terminal 2a without any other process being necessary. Further, when the wireless communication protocol is IEEE 802.11 and a security function is set, an authentication process of generating a key used when wireless data communication is performed is performed between the wireless communication network construction terminal 1a and the wireless communication network participation terminal 2a, and after the authentication process is completed, wireless data communication can be performed between the wireless communication network construction terminal 1a and the wireless communication network participation terminal 2a.

When the wireless communication protocol is the WPS, unique information (a password) used in encryption communication performed with a connection counterpart terminal during execution of a setup process by the WPS is set. After the unique information is set, encryption communication is performed with the connection counterpart terminal using the set unique information, and thus a setup process of specifying a predetermined authentication scheme and a predetermined encryption scheme is performed.

After the setup process ends, the communication connection request message is transmitted, and the message of permitting the communication connection request is transmitted. Further, when the authentication scheme and the encryption scheme which are specified in the setup process by the wireless communication network participation terminal 2a are schemes using no security function, wireless data communication can be performed between the wireless communication network construction terminal 1a and the wireless communication network participation terminal 2a without any other process being necessary. Further, when the authentication scheme and the encryption scheme which are specified in the setup process by the wireless communication network participation terminal 2a are schemes using a security function, the authentication process of generating a key used when wireless data communication is performed is performed between the wireless communication network construction terminal 1a and the wireless communication network participation terminal 2a, and after the authentication process is completed, wireless data communication can be performed between the wireless communication network construction terminal 1a and the wireless communication network participation terminal 2a.

As described above, according to the present embodiment, the wireless communication network construction terminal 1a generates vibration indicating a wireless communication protocol selected from among a plurality of wireless communication protocols, and the wireless communication network participation terminal 2a transmits the communication connection request message in accordance with the wireless communication protocol indicated by the vibration. As a result, the wireless communication network construction terminal 1a and the wireless communication network participation terminal 2a can support a plurality of wireless communication protocols.

First Modified Example

Figure 8:
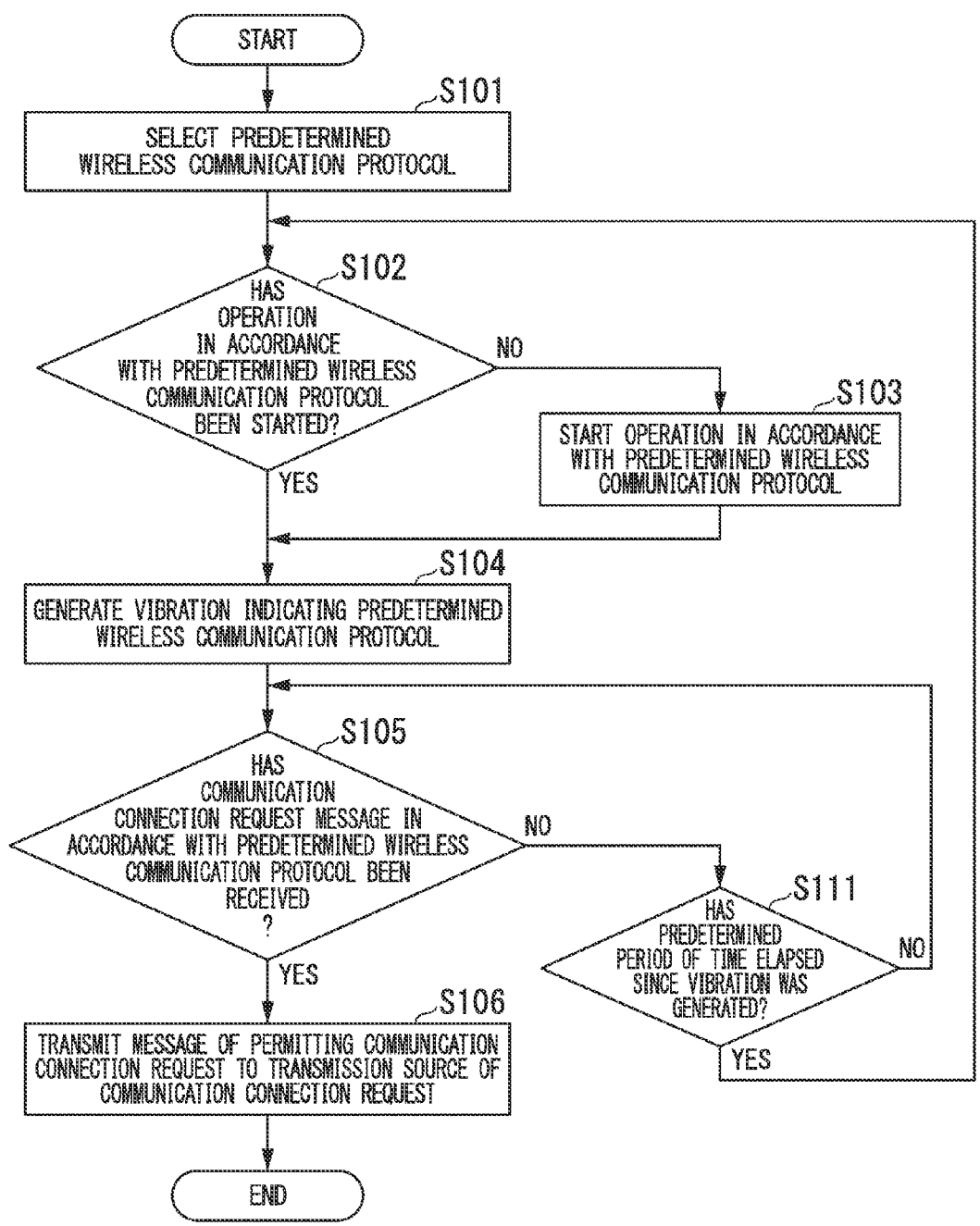
FIG. 8 is a flowchart illustrating an operation procedure of a wireless communication network construction terminal according to the first embodiment (a first modified example) of the present invention.

Next, a first modified example of the present embodiment is described. FIG. 8 illustrates an operation of the wireless communication network construction terminal 1a. In FIG. 8, the same operations as the operations illustrated in FIG. 5 are denoted by the same step numbers. In FIG. 8, an operation of step S111 is added to the operations illustrated in FIG. 5.

When it is determined in step S105 that the communication connection request message has not been received, the communication controller 101 determines whether a predetermined period of time has elapsed since vibration was generated in step S104 (step S111). When the predetermined period of time has not elapsed, the communication controller 101 monitors wireless communication performed by the wireless communicator 100 and determines whether the communication connection request message has been received (step S105). Further, when the predetermined period of time has elapsed, the communication controller 101 determines whether an operation in accordance with the selected predetermined wireless communication protocol has already been started (step S102). The remaining operations other than the above operation are the same as the operations illustrated in FIG. 5, and thus a description thereof is omitted here. Further, the operation of the wireless communication network participation terminal 2a is the same as the operation illustrated in FIG. 6, and thus a description thereof is omitted here.

Figure 9:
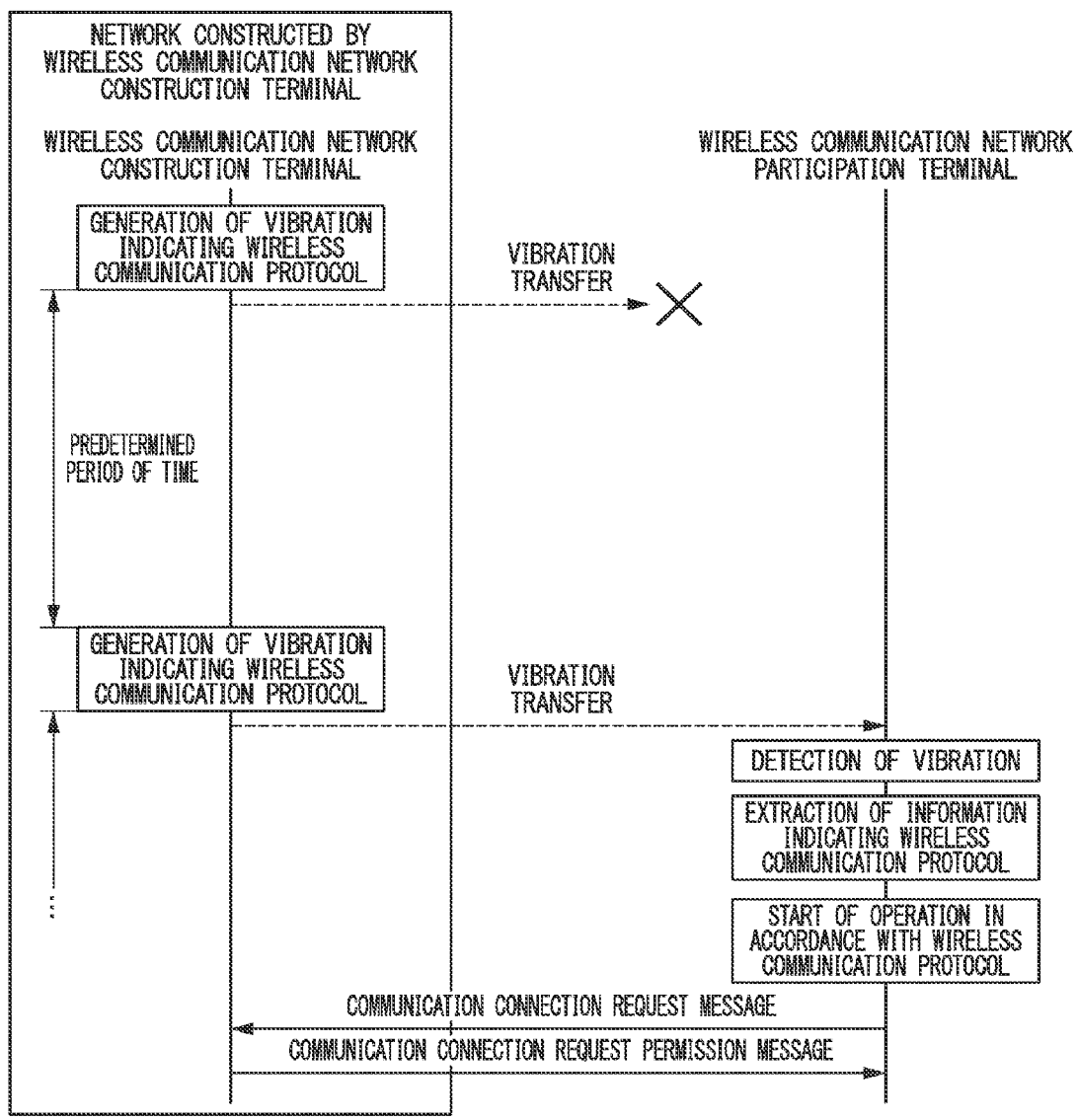
FIG. 9 is a sequence diagram illustrating an operation procedure of the wireless communication network construction terminal and a wireless communication network participation terminal according to the first embodiment (the first modified example) of the present invention.

FIG. 9 illustrates exemplary operations of the wireless communication network construction terminal 1a and the wireless communication network participation terminal 2a. In the example illustrated in FIG. 9, the wireless communication network construction terminal 1a is in a state in which construction of the wireless communication network is completed, and the operation in accordance with the wireless communication protocol has already been started at a point in time at which the operation illustrated in FIG. 9 starts.

The wireless communication network construction terminal 1a generates vibration indicating a wireless communication protocol (corresponding to step S104), but in the example, the wireless communication network participation terminal 2a does not detect vibration (corresponding to step S201). For example, there are cases in which the wireless communication network construction terminal 1a does not come into contact with the wireless communication network participation terminal 2a, and vibration is not transferred from the wireless communication network construction terminal 1a to the wireless communication network participation terminal 2a, and thus it is difficult for the wireless communication network participation terminal 2a to detect vibration. When a predetermined period of time elapses after vibration is generated (corresponding to step S111), the wireless communication network construction terminal 1a generates vibration indicating the same wireless communication protocol as a wireless communication protocol indicated by vibration generated at a previous time (corresponding to step S104).

The wireless communication network participation terminal 2a detects the vibration generated by the wireless communication network construction terminal 1a (corresponding to step S201). Then, the wireless communication network participation terminal 2a extracts information indicating a wireless communication protocol from information indicating a pattern of the detected vibration (corresponding to step S202), and starts an operation in accordance with the wireless communication protocol indicated by the extracted information (corresponding to step S203).

Then, the wireless communication network participation terminal 2a wirelessly transmits the communication connection request message in accordance with the wireless communication protocol indicated by the extracted information (corresponding to step S204). The wireless communication network construction terminal 1a wirelessly receives the communication connection request message wirelessly transmitted from the wireless communication network participation terminal 2a (corresponding to step S105), and transmits a message of permitting the communication connection request to the wireless communication network participation terminal 2a (corresponding to step S106).

The wireless communication network construction terminal 1b illustrated in FIG. 2 and the wireless communication network participation terminal 2b illustrated in FIG. 4 can perform the operation described in the present modified example as well. The detailed operation is the same as the above-described operation, and thus a description thereof is omitted here.

In the present modified example, the wireless communication network construction terminal 1a and the wireless communication network participation terminal 2a can support a plurality of wireless communication protocols. Further, even when the vibration generated by the wireless communication network construction terminal 1a is not properly transmitted to the wireless communication network participation terminal 2a, the wireless communication network construction terminal 1a generates vibration once again, and thus the wireless communication network participation terminal 2a can more reliably perform communication connection.

Second Modified Example

Figure 10:
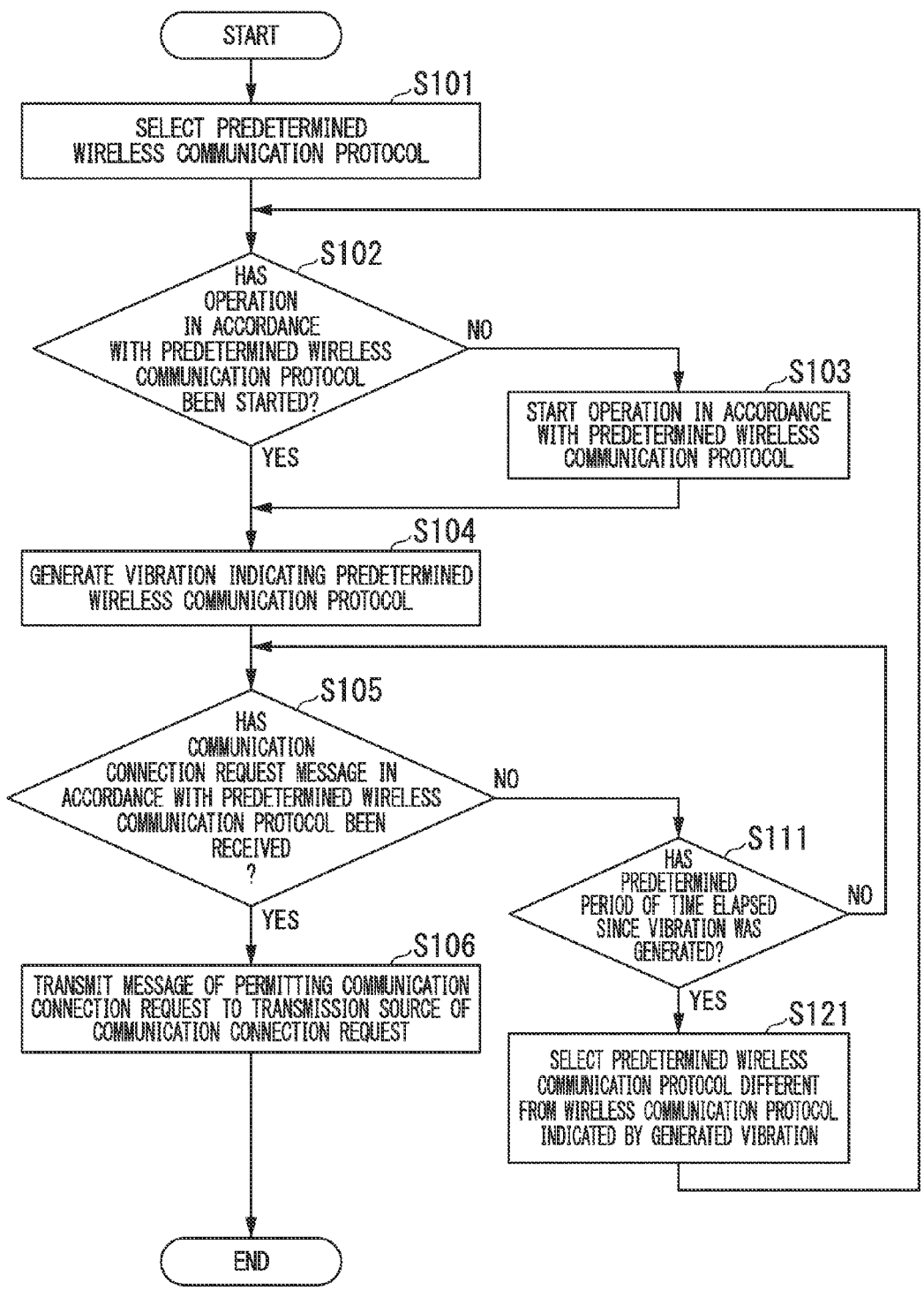
FIG. 10 is a flowchart illustrating an operation procedure of a wireless communication network construction terminal according to the first embodiment (a second modified example) of the present invention.

Next, a second modified example of the present embodiment is described. FIG. 10 illustrates an operation of the wireless communication network construction terminal 1a. In FIG. 10, the same operations as the operations illustrated in FIG. 8 are denoted by the same step numbers. In FIG. 10, an operation of step S121 is added to the operations illustrated in FIG. 8.

When it is determined in step S111 that a predetermined period of time has elapsed, the wireless communication protocol selector 102 selects a predetermined wireless communication protocol different from a wireless communication protocol selected at a previous time from among a plurality of wireless communication protocols (step S121). The wireless communication protocol selected in S121 is a wireless communication protocol different from a wireless communication protocol indicated by vibration generated at a previous time. After the wireless communication protocol is selected, the communication controller 101 determines whether the operation in accordance with the selected predetermined wireless communication protocol has already been started (step S102). The remaining operations other than the above operation are the same as the operations illustrated in FIG. 8, and thus a description thereof is omitted here. Further, the operation of the wireless communication network participation terminal 2a is the same as the operation illustrated in FIG. 6, and thus a description thereof is omitted here.

Figure 11:
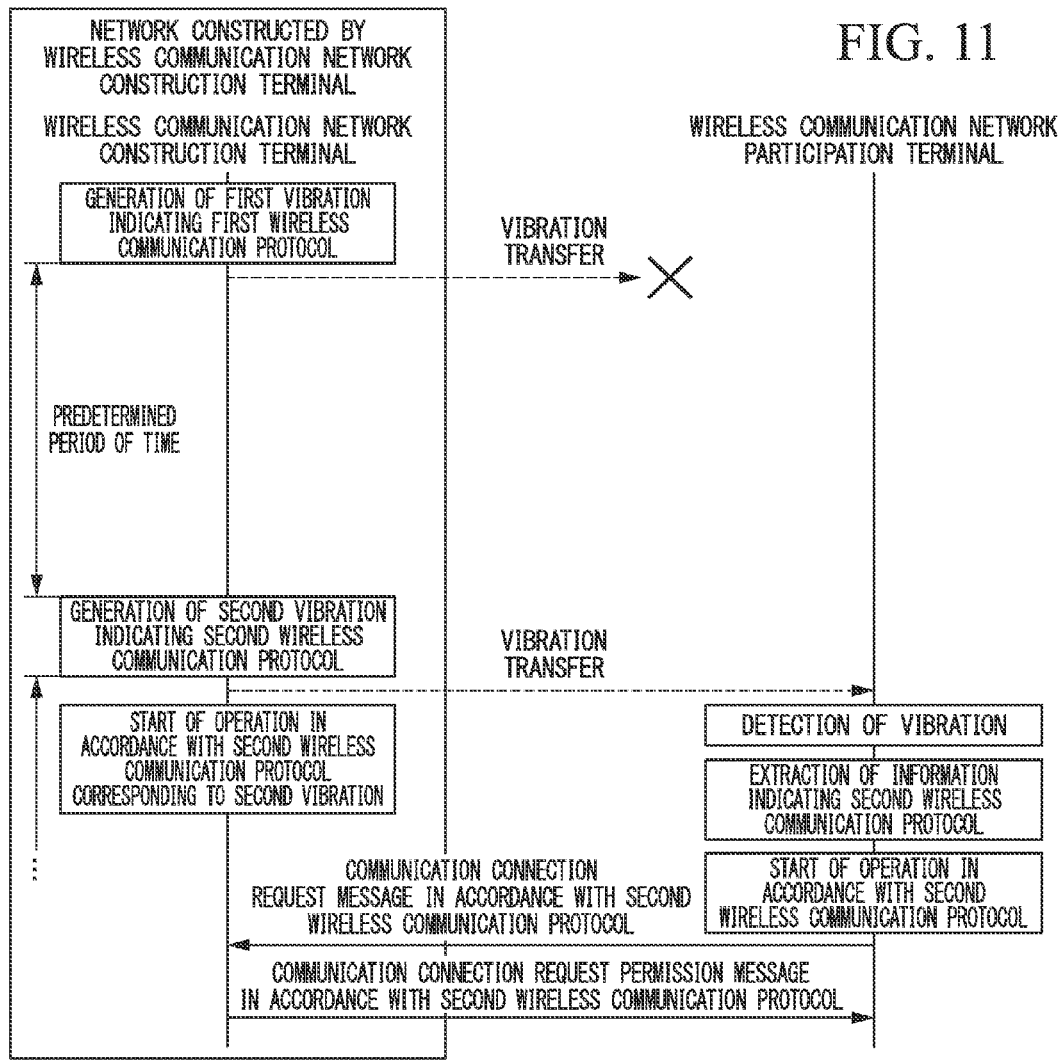
FIG. 11 is a sequence diagram illustrating an operation procedure of the wireless communication network construction terminal and a wireless communication network participation terminal according to the first embodiment (the second modified example) of the present invention.

FIG. 11 illustrates exemplary operations of the wireless communication network construction terminal 1a and the wireless communication network participation terminal 2a. In FIG. 11, the wireless communication network construction terminal 1a is in a state in which construction of the wireless communication network is completed, and the operation in accordance with the wireless communication protocol has already been started at a point in time at which the operation illustrated in FIG. 11 starts.

The wireless communication network construction terminal 1a generates vibration indicating a first wireless communication protocol (corresponding to step S104), but in this example, the wireless communication network participation terminal 2a does not detect vibration (corresponding to step S201). For example, there are cases in which the wireless communication network construction terminal 1a does not come into contact with the wireless communication network participation terminal 2a, and vibration is not transferred from the wireless communication network construction terminal 1a to the wireless communication network participation terminal 2a, and thus it is difficult for the wireless communication network participation terminal 2a to detect vibration. When a predetermined period of time elapses after vibration is generated (corresponding to step S111), the wireless communication network construction terminal 1a generates vibration indicating a second wireless communication protocol different from a first wireless communication protocol indicated by vibration generated at a previous time (corresponding to step S121). After vibration is generated, the wireless communication network construction terminal 1a starts an operation in accordance with the second wireless communication protocol (corresponding to step S103).

The wireless communication network participation terminal 2a detects the vibration generated by the wireless communication network construction terminal 1a (corresponding to step S201). Then, the wireless communication network participation terminal 2a extracts information indicating the second wireless communication protocol from information indicating a pattern of the detected vibration (corresponding to step S202), and starts the operation in accordance with the second wireless communication protocol indicated by the extracted information (corresponding to step S203).

Then, the wireless communication network participation terminal 2a wirelessly transmits the communication connection request message in accordance with the second wireless communication protocol indicated by the extracted information (corresponding to step S204). The wireless communication network construction terminal 1a wirelessly receives the communication connection request message wirelessly transmitted from the wireless communication network participation terminal 2a (corresponding to step S105), and transmits a message of permitting the communication connection request to the wireless communication network participation terminal 2a (corresponding to step S106).

The wireless communication network construction terminal 1b illustrated in FIG. 2 and the wireless communication network participation terminal 2b illustrated in FIG. 4 can perform the operation described in the present modified example as well. The detailed operation is the same as the above-described operation, and thus a description thereof is omitted here.

In the present modified example, the wireless communication network construction terminal 1a and the wireless communication network participation terminal 2a can support a plurality of wireless communication protocols. Further, even when the vibration generated by the wireless communication network construction terminal 1a is not properly transmitted to the wireless communication network participation terminal 2a, the wireless communication network construction terminal 1a generates vibration once again, and thus the wireless communication network participation terminal 2a can more reliably perform communication connection. Further, even when the vibration generated by the wireless communication network construction terminal 1a indicates a wireless communication protocol which is not supported by the wireless communication network participation terminal 2a, the wireless communication network construction terminal 1a generates vibration indicating a wireless communication protocol different from a wireless communication protocol indicated by vibration generated at a previous time, and thus the wireless communication network participation terminal 2a can more reliably perform communication connection.

Third Modified Example

Next, a third modified example of the present embodiment is described. In the present modified example, the vibration detector 202 of the wireless communication network participation terminal 2a is a motion sensor, and the motion sensor detects vibration. The detailed operation according to the present modified example is the same as the operation illustrated in FIGS. 5 and 6.

The wireless communication network construction terminal 1b illustrated in FIG. 2 and the wireless communication network participation terminal 2b illustrated in FIG. 4 can perform the operation described in the present modified example as well. The detailed operation is the same as the above-described operation, and thus a description thereof is omitted here.

In the present modified example, the wireless communication network construction terminal 1a and the wireless communication network participation terminal 2a can support a plurality of wireless communication protocols. Further, when the wireless communication network participation terminal 2a is a terminal (a digital still camera, a mobile telephone, a smartphone, a tablet, or the like) including a motion sensor, it is possible to detect vibration using the original function of the terminal. Thus, it is possible to prevent an increase in cost.

Second Embodiment

Figure 12:
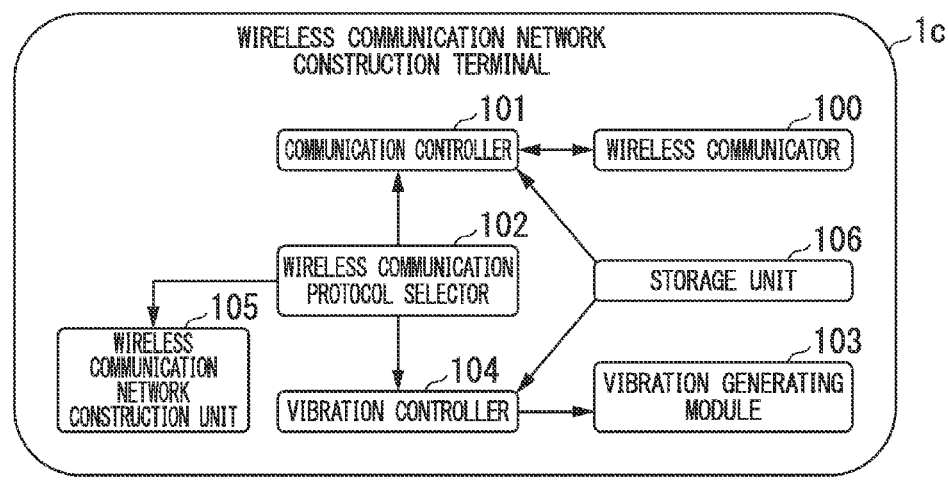
FIG. 12 is a block diagram illustrating the constitution of a wireless communication network construction terminal according to a second embodiment of the present invention.

Next, a second embodiment of the present invention is described. FIG. 12 illustrates the constitution of a wireless communication network construction terminal according to the present embodiment. In FIG. 12, the same components as the components illustrated in FIG. 1 are denoted by the same reference numerals. A wireless communication network construction terminal 1c illustrated in FIG. 12 has a constitution in which a storage unit 106 is added to the constitution of the wireless communication network construction terminal 1a illustrated in FIG. 1. The storage unit 106 stores setting information of a wireless communication network. Further, in the present embodiment, the vibration controller 104 causes the vibration generating module 103 to generate vibration indicating the wireless communication protocol selected by the wireless communication protocol selector 102 and vibration indicating the setting information of the wireless communication network stored in the storage unit 106.

The constitution of the wireless communication network participation terminal according to the present embodiment is the same as the constitution of the wireless communication network participation terminal 2a illustrated in FIG. 3. Here, in the present embodiment, the information extractor 203 extracts information indicating a predetermined wireless communication protocol and the setting information of the wireless communication network from the pattern of vibration detected by the vibration detector 202.

Figure 13:
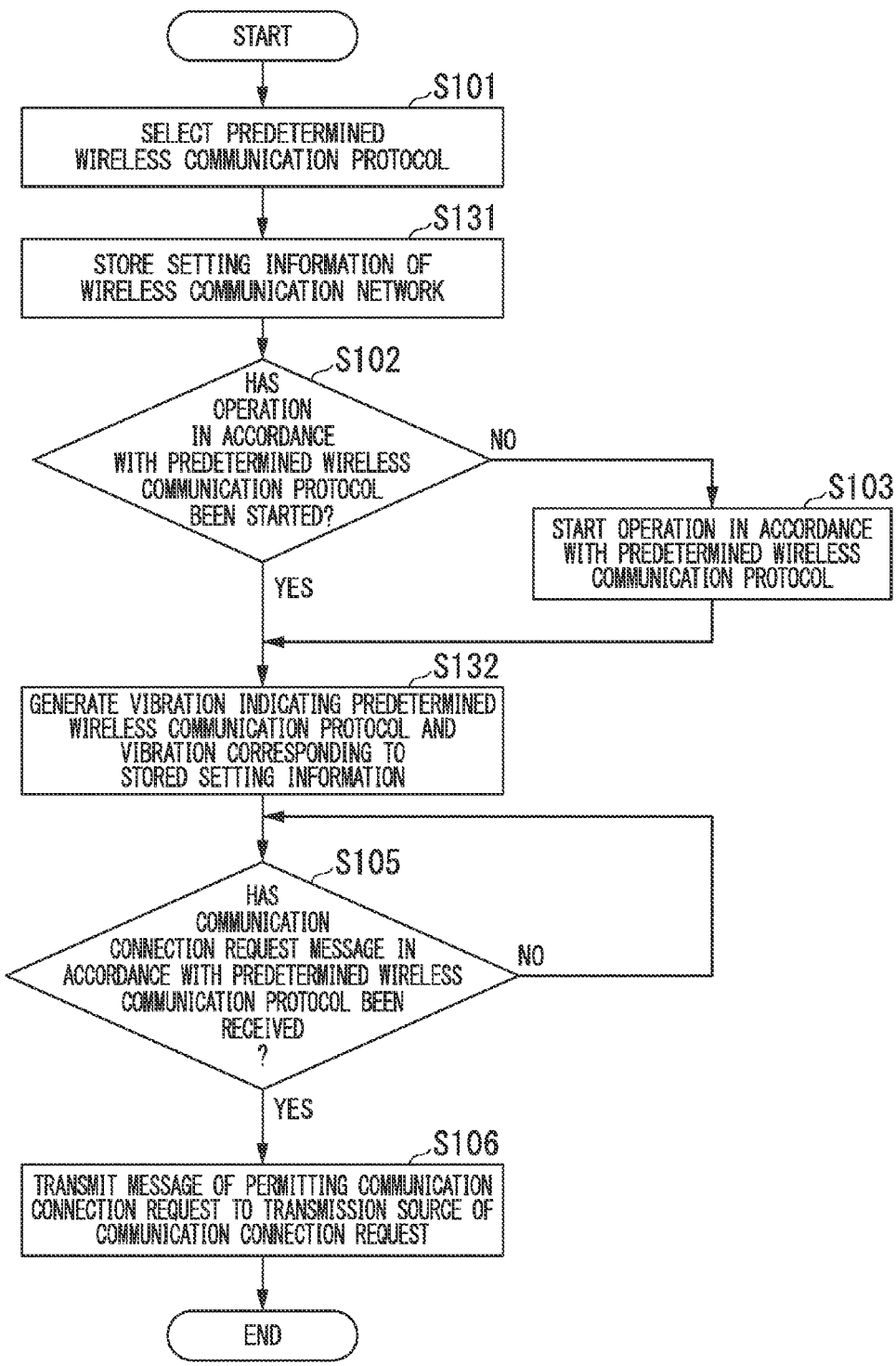
FIG. 13 is a flowchart illustrating an operation procedure of the wireless communication network construction terminal according to the second embodiment of the present invention.

FIG. 13 illustrates an operation of the wireless communication network construction terminal 1c. In FIG. 13, the same operations as the operations illustrated in FIG. 5 are denoted by the same step numbers. In FIG. 13, an operation of step S131 is added to the operations illustrated in FIG. 5, and the operation of step S104 is replaced with an operation of step S132.

After a predetermined wireless communication protocol is selected in step S101, the setting information of the wireless communication network is input to the storage unit 106, and the storage unit 106 stores the setting information of the wireless communication network (step S131). For example, the wireless communication network construction terminal 1c includes an operation unit which is not illustrated in FIG. 12, and as the user operates the operation unit, the setting information of the wireless communication network is input to the wireless communication network construction terminal 1c and stored in the storage unit 106. Alternatively, setting information of a wireless communication network including one of a random value, a value based on a media access control (MAC) address, a value based on the serial number of the wireless communication network construction terminal 1c, or the like is generated in the wireless communication network construction terminal 1c and stored in the storage unit 106. Alternatively, setting information of a wireless communication network is input to the wireless communication network construction terminal 1c through communication or the like and stored in the storage unit 106. The setting information of the wireless communication network may be stored in the wireless communication network construction terminal 1c in advance before shipping of the wireless communication network construction terminal 1c.

For example, the setting information of the wireless communication network includes information such as an authentication scheme (open, WPA, WPA2, or the like), an encryption scheme (WEP, TKIP, AES-CCMP, or the like), and an encryption key (a WEP key or a passphrase (in the case of WPA or WPA2)). The encryption scheme information may not be included.

After the setting information of the wireless communication network is stored in the storage unit 106, the communication controller 101 determines whether the operation in accordance with the selected predetermined wireless communication protocol has already been started (step S102). Further, when it is determined in step S102 that the operation in accordance with the predetermined wireless communication protocol has not been started or after the operation in accordance with the wireless communication protocol is started in step S103, the following process is performed. The vibration controller 104 controls the vibration generating module 103 such that the vibration generating module 103 consecutively generates the vibration indicating the predetermined wireless communication protocol selected in step S101 and vibration indicating the setting information of the wireless communication network stored in the storage unit 106. The vibration generating module 103 generates the vibration indicating the predetermined wireless communication protocol and the vibration indicating the setting information of the wireless communication network stored in the storage unit 106 in accordance with control by the vibration controller 104 (step S132).

For example, vibration includes vibration serving as a header portion indicating a type (a wireless communication protocol, an authentication scheme, an encryption scheme, a passphrase, and the like) of information of each of a wireless communication protocol and setting information of a wireless communication network and vibration serving as a value of each type. For example, the following pieces of vibration (1) to (8) are continuously generated in this order:

(1) vibration indicating that next vibration is a wireless communication protocol;

(2) vibration indicating a predetermined wireless communication protocol;

(3) vibration indicating that next vibration is an authentication scheme value;

(4) vibration indicating an authentication scheme value;

(5) vibration indicating that next vibration is an encryption scheme value;

(6) vibration indicating an encryption scheme value;

(7) vibration indicating that next vibration is a passphrase; and (8) vibration indicating a character string of a passphrase.

After vibration is generated, the communication controller 101 monitors wireless communication performed by the wireless communicator 100, and determines whether the communication connection request message in accordance with the predetermined wireless communication protocol has been received (step S105). The remaining operations other than the above operation are the same as the operations illustrated in FIG. 5, and thus a description thereof is omitted here.

Figure 14:
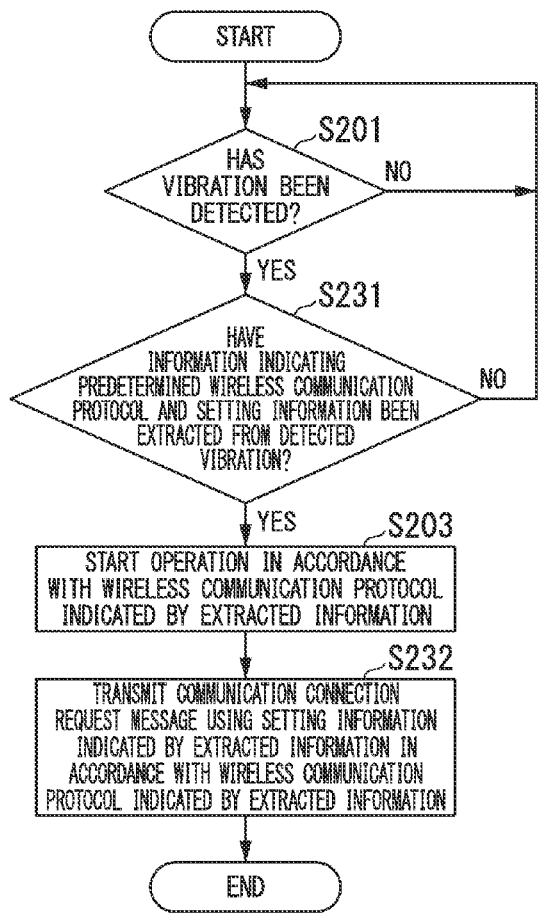
FIG. 14 is a flowchart illustrating an operation procedure of a wireless communication network participation terminal according to the second embodiment of the present invention.

FIG. 14 illustrates an operation of the wireless communication network participation terminal 2a. In FIG. 14, the same operations as the operations illustrated in FIG. 6 are denoted by the same step numbers. In FIG. 14, for the operation illustrated in FIG. 6, the operation of step S202 is replaced with an operation of step S231, and the operation of step S204 is replaced with an operation of step S232.

When it is determined in step S201 that vibration has been detected, the vibration detector 202 notifies the information extractor 203 of information indicating a pattern of the detected vibration. The information extractor 203 performs a process of extracting information indicating a predetermined wireless communication protocol and the setting information of the wireless communication network from the information notified of by the vibration detector 202, and determines whether the information has been extracted (step S231). For example, the information indicating a predetermined wireless communication protocol and the setting information of the wireless communication network are stored in a storage unit which is not illustrated in FIG. 2. Then, the information extractor 203 compares the information notified of by the vibration detector 202 with the information stored in the storage unit, and determines that the information indicating the wireless communication protocol and the setting information of the wireless communication network which correspond to the information stored in the storage unit have been extracted when the pieces of information are identical.

When it is determined that the information has not been extracted, the vibration detector 202 monitors vibration and determines whether vibration has been detected (step S201). Further, when it is determined that the information has been extracted, the communication controller 201 controls the wireless communicator 200 such that the wireless communicator 200 starts the operation in accordance with the predetermined wireless communication protocol indicated by the information extracted by the information extractor 203 (step S203).

After the operation in accordance with the predetermined wireless communication protocol is started, the communication controller 201 controls the wireless communicator 200 such that the wireless communicator 200 generates the communication connection request message in accordance with the predetermined wireless communication protocol. Further, the communication controller 201 wirelessly transmits the generated communication connection request message to the wireless communication network construction terminal 1a using the setting information indicated by the information extracted by the information extractor 203. Through this operation, the wireless communicator 200 wirelessly transmits the communication connection request message to the wireless communication network construction terminal 1a (step S232). The remaining operations other than the above operation are the same as the operations illustrated in FIG. 6, and thus a description thereof is omitted here.

Figure 15:
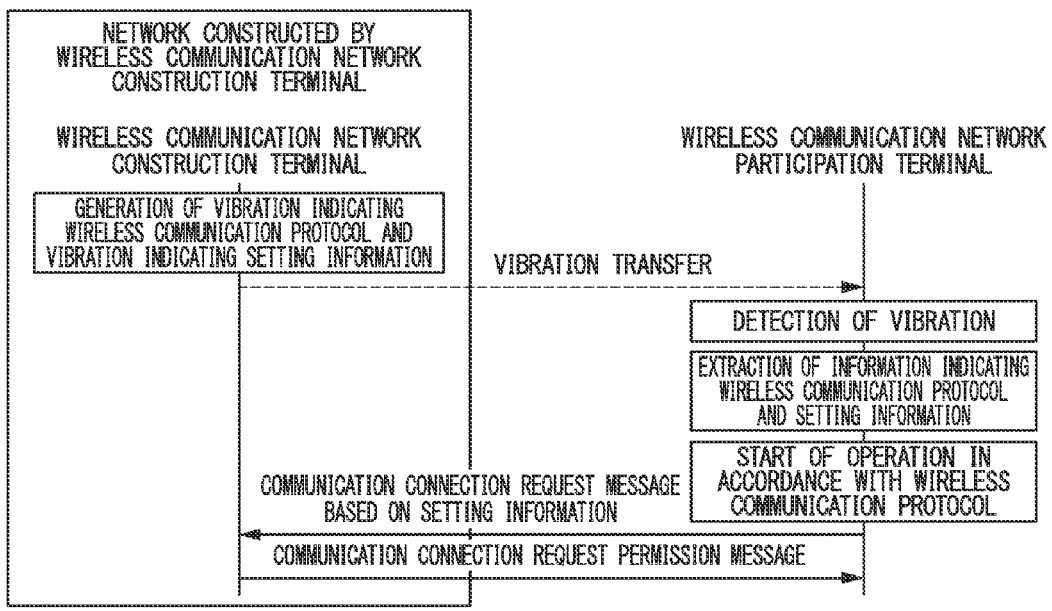
FIG. 15 is a sequence diagram illustrating an operation procedure of the wireless communication network construction terminal and the wireless communication network participation terminal according to the second embodiment of the present invention.

FIG. 15 illustrates exemplary operations of the wireless communication network construction terminal 1c and the wireless communication network participation terminal 2a. In the example illustrated in FIG. 15, the wireless communication network construction terminal 1c is in a state in which construction of the wireless communication network is completed, and the operation in accordance with the wireless communication protocol has already been started at a point in time at which the operation illustrated in FIG. 15 starts.

The wireless communication network construction terminal 1c generates vibration indicating a wireless communication protocol and vibration indicating the setting information of the wireless communication network (corresponding to step S132). The wireless communication network participation terminal 2a detects vibration (corresponding to step S201). Then, the wireless communication network participation terminal 2a extracts information indicating a wireless communication protocol and setting information of the wireless communication network from information indicating a pattern of the detected vibration (corresponding to step S231). Further, the wireless communication network participation terminal 2a starts an operation in accordance with the wireless communication protocol indicated by the extracted information (corresponding to step S203).

Then, the wireless communication network participation terminal 2a wirelessly transmits the communication connection request message using the setting information indicated by the extracted information in accordance with the wireless communication protocol indicated by the extracted information (corresponding to step S232). The wireless communication network construction terminal 1c wirelessly receives the communication connection request message wirelessly transmitted from the wireless communication network participation terminal 2a (corresponding to step S105), and transmits a message of permitting the communication connection request to the wireless communication network participation terminal 2a (corresponding to step S106).

The wireless communication network construction terminal 1b illustrated in FIG. 2 and the wireless communication network participation terminal 2b illustrated in FIG. 4 can perform the operation described in the present embodiment as well. The detailed operation is the same as the above-described operation, and thus a description thereof is omitted here.

According to the present embodiment, the wireless communication network construction terminal 1c and the wireless communication network participation terminal 2a can support a plurality of wireless communication protocols. Further, the wireless communication network participation terminal 2a can acquire the setting information of the wireless communication network from the detected vibration. As a result, the wireless communication network participation terminal 2a can acquire information necessary for a communication connection of a wireless communication network in which security is set, and thus the user's operation can be reduced.

Third Embodiment

Figure 16:
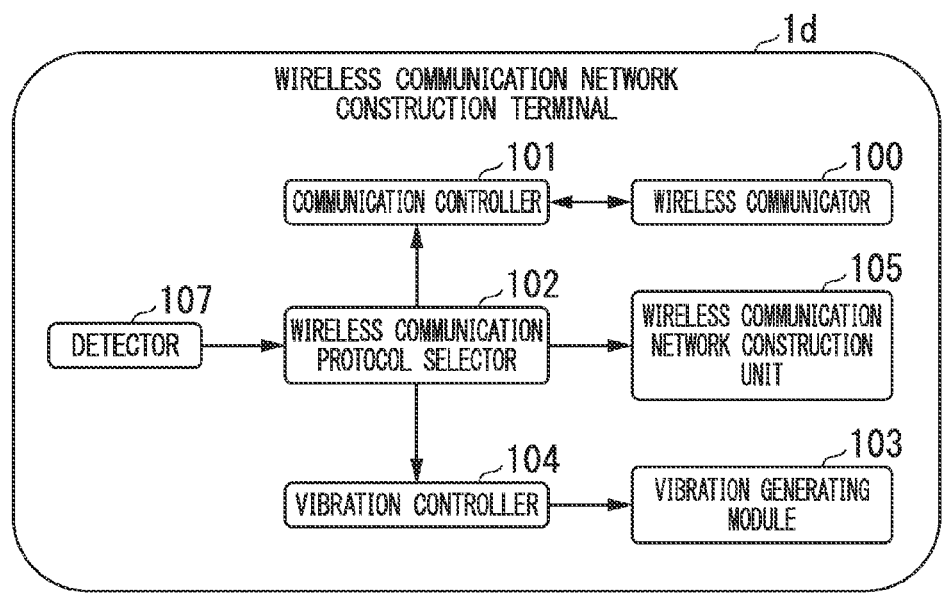
FIG. 16 is a block diagram illustrating the constitution of a wireless communication network construction terminal according to a third embodiment of the present invention.

Next, a third embodiment of the present invention is described. FIG. 16 illustrates the constitution of a wireless communication network construction terminal according to the present embodiment. In FIG. 16, components having the same functions as the components illustrated in FIG. 1 are denoted by the same reference numerals. A wireless communication network construction terminal 1d illustrated in FIG. 16 has a constitution in which a detector 107 is added to the constitution of the wireless communication network construction terminal 1a illustrated in FIG. 1. The detector 107 detects contact of an external object (in the case of the present embodiment, the wireless communication network participation terminal) with the wireless communication network construction terminal 1d.

Figure 17:
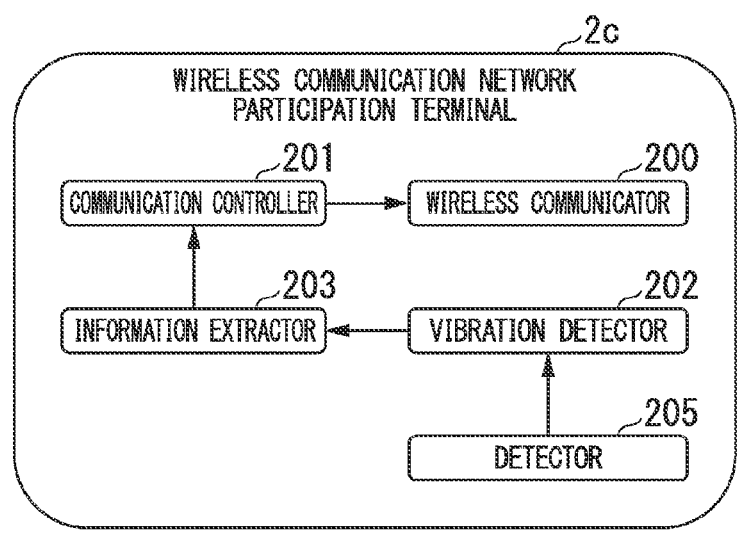
FIG. 17 is a block diagram illustrating the constitution of a wireless communication network participation terminal according to the third embodiment of the present invention.

FIG. 17 illustrates the constitution of a wireless communication network participation terminal according to the present embodiment. In FIG. 17, components having the same functions as the components illustrated in FIG. 3 are denoted by the same reference numerals. A wireless communication network participation terminal 2c illustrated in FIG. 17 has a constitution in which a detector 205 is added to the constitution of the wireless communication network participation terminal 2a illustrated in FIG. 3. The detector 205 detects contact of an external object (in the case of the present embodiment, the wireless communication network construction terminal) with the wireless communication network participation terminal 2c.

Figure 18:
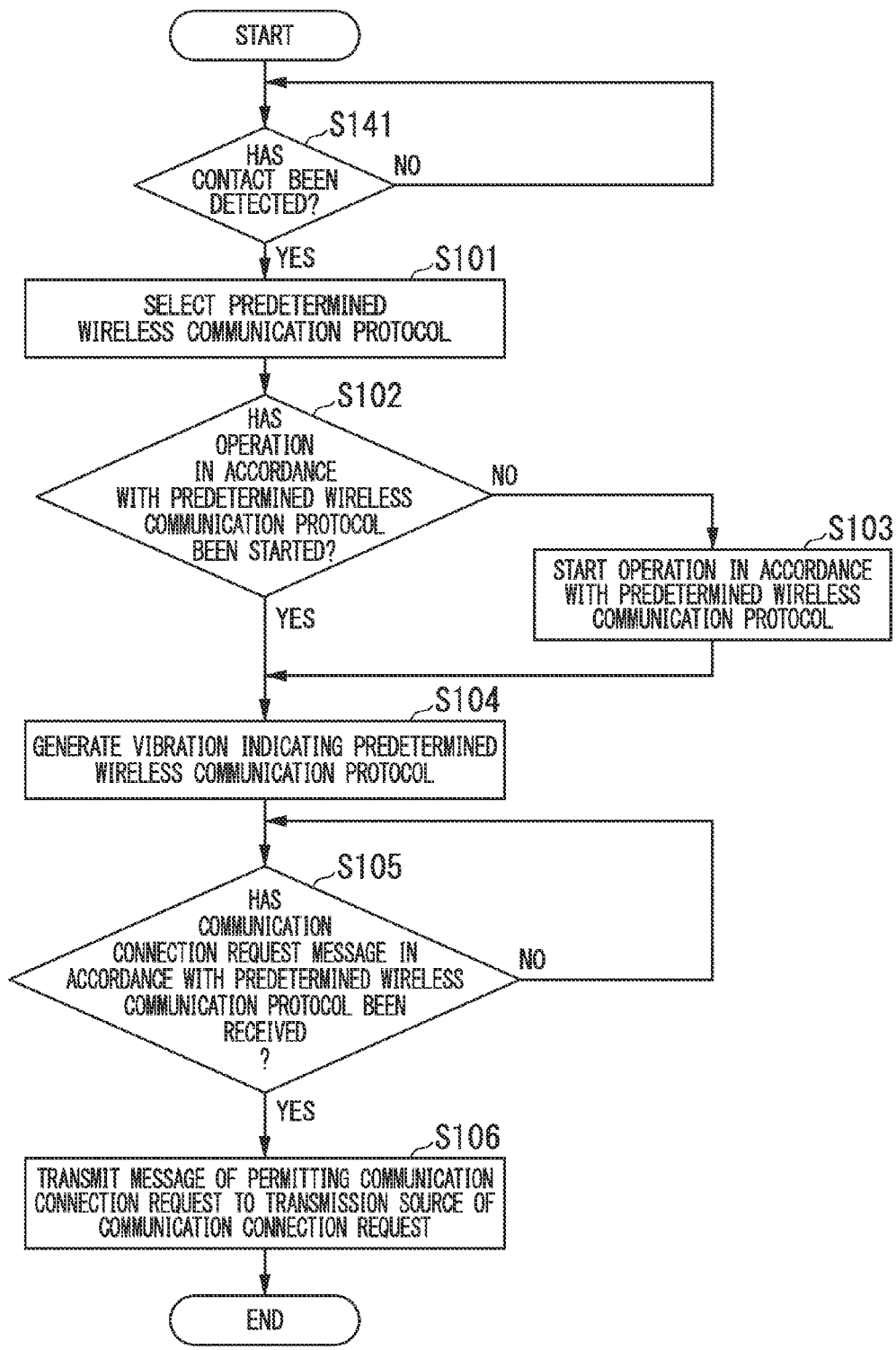
FIG. 18 is a flowchart illustrating an operation procedure of the wireless communication network construction terminal according to the third embodiment of the present invention.

FIG. 18 illustrates an operation of the wireless communication network construction terminal 1d. In FIG. 18, the same operations as the operations illustrated in FIG. 5 are denoted by the same step numbers. In FIG. 18, an operation of step S141 is added to the operations illustrated in FIG. 5.

First, the detector 107 monitors contact of the wireless communication network participation terminal 2c, and determines whether the contact of the wireless communication network participation terminal 2c has been detected (step S141). For example, the wireless communication network construction terminal 1d is a camera (an imaging device) having a shake detection function. In this case, the detector 107 determines whether the contact of the wireless communication network participation terminal 2c has been detected by determining whether a pattern of vibration detected by a sensor such as an acceleration sensor detecting shake is identical to a pattern of a characteristic vibration generated at the time of contact of the wireless communication network participation terminal 2c.

Alternatively, for example, the wireless communication network construction terminal 1d includes a touch panel, and the respective terminals are configured so that the wireless communication network participation terminal 2c comes into contact with the touch panel when the wireless communication network construction terminal 1d comes into contact with the wireless communication network participation terminal 2c. In this case, the detector 107 determines whether the contact of the wireless communication network participation terminal 2c has been detected based on the contact state on the touch panel. For example, the detector 107 determines whether the area size of a touched region in the touch panel is equal to or larger than a predetermined value.

Alternatively, for example, the respective terminals are configured so that the wireless communication network construction terminal 1d can fit into the wireless communication network participation terminal 2c, and a mechanism (member) whose state such as its position changes when the respective terminals fit into each other is disposed in the wireless communication network construction terminal 1d. In this case, the detector 107 determines whether the contact of the wireless communication network participation terminal 2c has been detected by determining whether the state of the mechanism has been changed.

When it is determined that contact has not been detected, the detector 107 keeps monitoring contact and determining whether contact has been detected. Further, when it is determined that contact has been detected, the wireless communication protocol selector 102 selects a predetermined wireless communication protocol from among a plurality of wireless communication protocols (step S101). The remaining operations other than the above operation are the same as the operations illustrated in FIG. 5, and thus a description thereof is omitted here.

Figure 19:
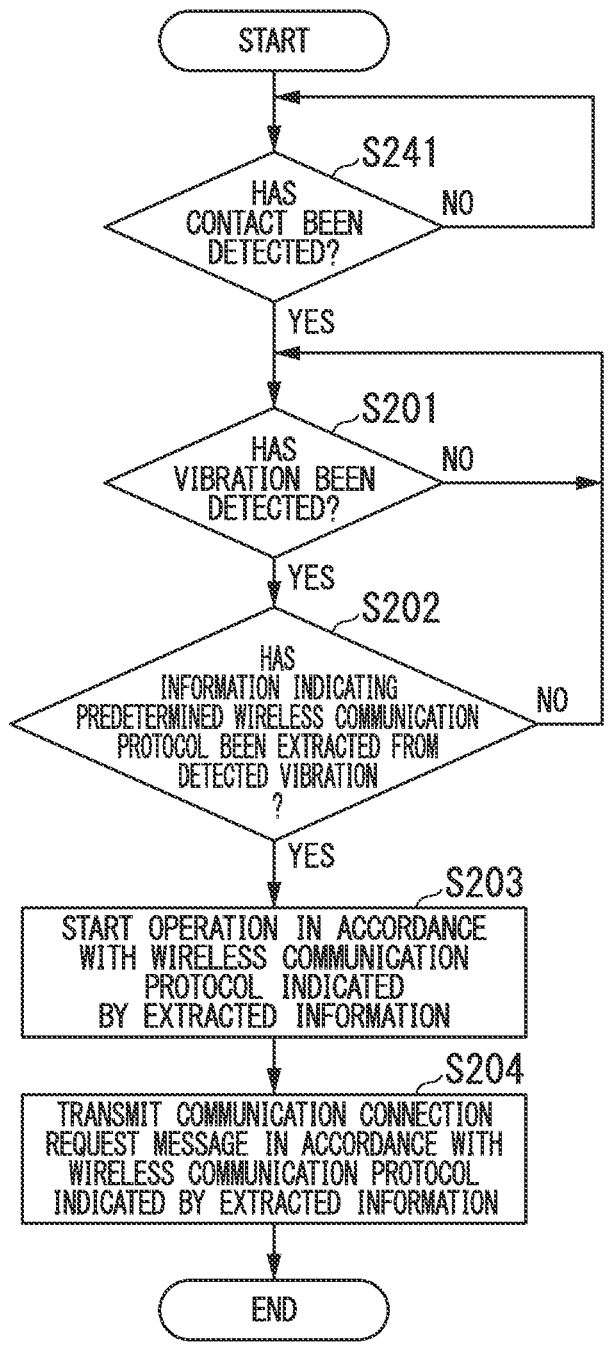
FIG. 19 is a flowchart illustrating an operation procedure of the wireless communication network participation terminal according to the third embodiment of the present invention.

FIG. 19 illustrates an operation of the wireless communication network participation terminal 2c. In FIG. 19, the same operations as the operations illustrated in FIG. 6 are denoted by the same step numbers. In FIG. 19, an operation of step S241 is added to the operation illustrated in FIG. 6.

First, the detector 205 monitors contact of the wireless communication network construction terminal 1d, and determines whether contact of the wireless communication network construction terminal 1d has been detected (step S241). A concrete example of the operation of step S241 is the same as the concrete example of the operation of step S141.

When it is determined that contact has not been detected, the detector 205 keeps monitoring contact and determining whether contact has been detected. Further, when it is determined that contact has been detected, the vibration detector 202 monitors vibration, and determines whether vibration has been detected (step S201). The remaining operations other than the above operation are the same as the operations illustrated in FIG. 6, and thus a description thereof is omitted here.

Figure 20:
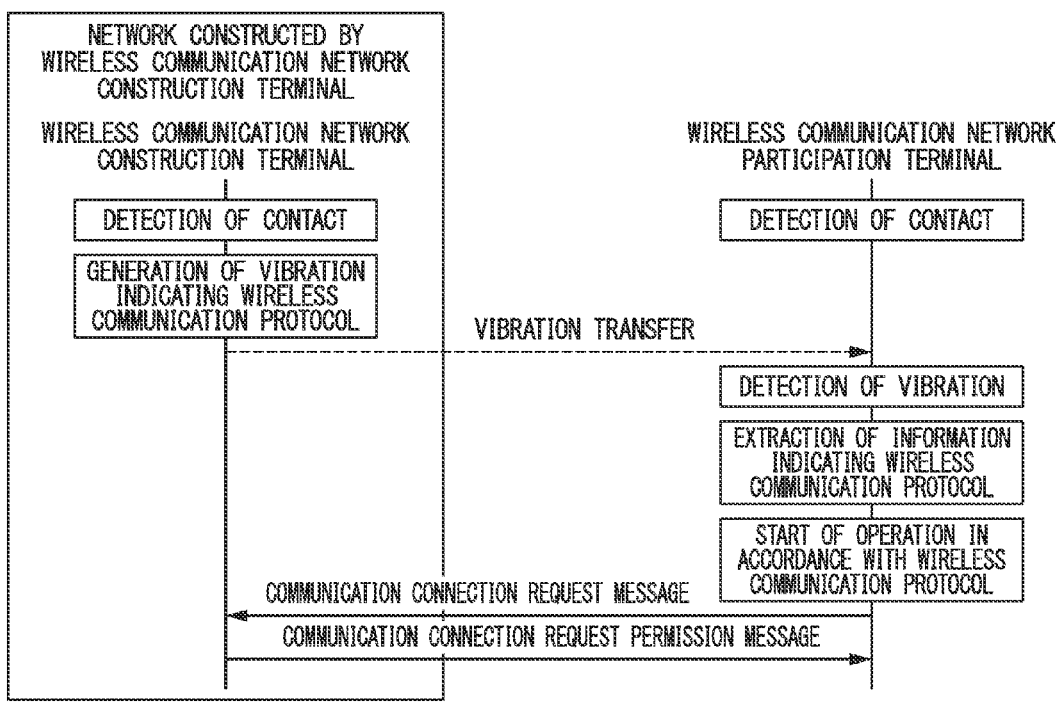
FIG. 20 is a sequence diagram illustrating an operation procedure of the wireless communication network construction terminal and the wireless communication network participation terminal according to the third embodiment of the present invention.

FIG. 20 illustrates exemplary operations of the wireless communication network construction terminal 1d and the wireless communication network participation terminal 2c. In the example illustrated in FIG. 20, the wireless communication network construction terminal 1d is in a state in which construction of the wireless communication network is completed, and the operation in accordance with the wireless communication protocol has already been started at a point in time at which the operation illustrated in FIG. 20 starts.

When the wireless communication network construction terminal 1d comes into contact with the wireless communication network participation terminal 2c, both terminals detect contact (corresponding to steps S141 and S241). After detecting contact, the wireless communication network construction terminal 1d generates vibration indicating a wireless communication protocol (corresponding to step S104). Further, after detecting contact, the wireless communication network participation terminal 2c detects vibration (corresponding to step S201). A subsequent operation is the same as the operation illustrated in FIG. 7, and thus a description thereof is omitted here.

A wireless communication network construction terminal having a constitution in which the detector 107 is added to the constitution of the wireless communication network construction terminal 1b illustrated in FIG. 2 and a wireless communication network participation terminal having a constitution in which the detector 205 is added to the constitution of the wireless communication network participation terminal 2b illustrated in FIG. 4 can perform the operation described in the present embodiment as well. The detailed operation is the same as the above-described operation, and thus a description thereof is omitted here.

According to the present embodiment, the wireless communication network construction terminal 1d and the wireless communication network participation terminal 2c can support a plurality of wireless communication protocols. Further, the wireless communication network construction terminal 1d and the wireless communication network participation terminal 2c generate or detect vibration after checking that there is contact, and thus need neither generate nor detect vibration in the non-contact state. Thus, useless power consumption can be reduced. Further, it is possible to prevent a situation in which vibration is generated in the non-contact state and the user becomes confused.

Fourth Embodiment

Figure 21:
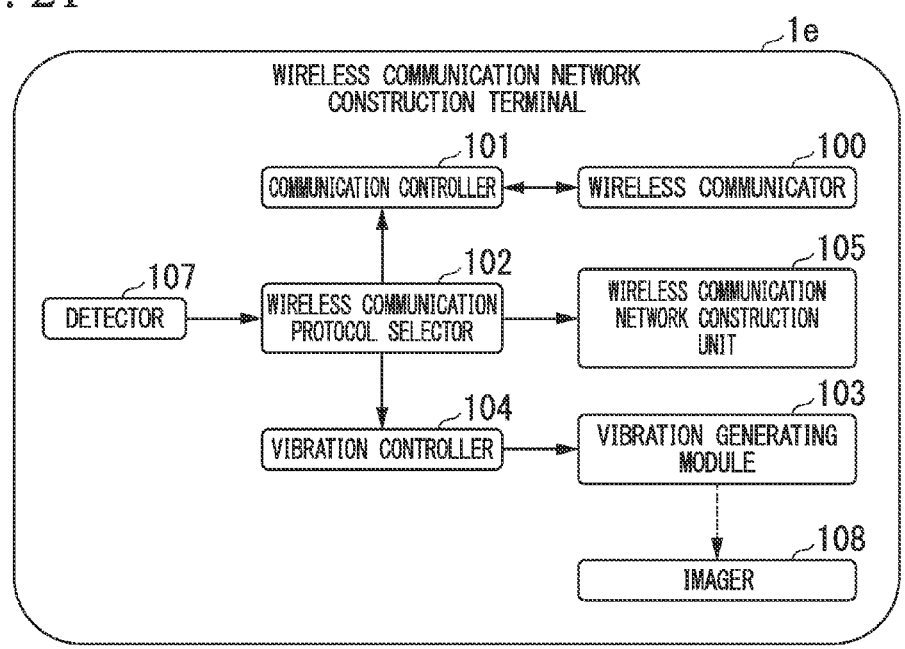
FIG. 21 is a block diagram illustrating the constitution of a wireless communication network construction terminal according to a fourth embodiment of the present invention.

Next, a fourth embodiment of the present invention is described. FIG. 21 illustrates the constitution of a wireless communication network construction terminal according to the present embodiment. In FIG. 21, components having the same functions as the components illustrated in FIG. 16 are denoted by the same reference numerals. A wireless communication network construction terminal 1e illustrated in FIG. 21 has a constitution in which an imager 108 is added to the constitution of the wireless communication network construction terminal 1d illustrated in FIG. 16. The imager 108 includes an imaging element, and images a subject and generates an image signal. Further, in the present embodiment, the vibration controller 104 causes the vibration generating module 103 to generate vibration indicating a wireless communication protocol and vibration for dropping an object (small dust or the like) attached to a filter arranged on the front surface of the imaging element of the imager 108. The constitution of a wireless communication network participation terminal according to the present embodiment is the same as the constitution of the wireless communication network participation terminal 2c illustrated in FIG. 17.

Figure 22:
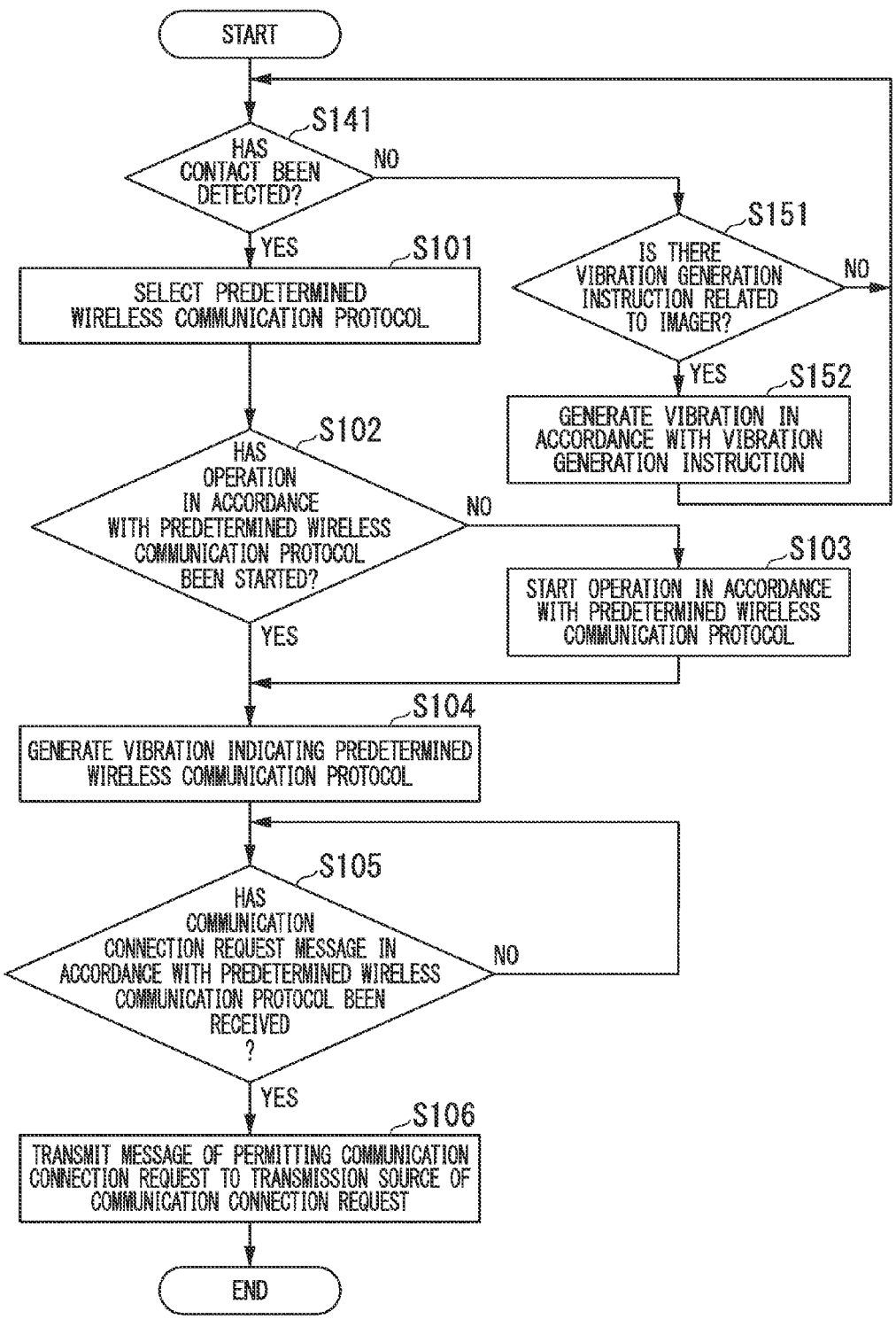
FIG. 22 is a flowchart illustrating an operation procedure of the wireless communication network construction terminal according to the fourth embodiment of the present invention.

FIG. 22 illustrates an operation of the wireless communication network construction terminal 1e. In FIG. 22, the same operations as the operations illustrated in FIG. 18 are denoted by the same step numbers. In FIG. 22, operations of steps S151 and S152 are added to the operation illustrated in FIG. 18.

When it is determined in step S141 that contact has not been detected, the vibration controller 104 determines whether there is an instruction to generate vibration related to the imager 108 (step S151). When it is determined that there is no instruction to generate vibration related to the imager 108, the detector 107 monitors contact of the wireless communication network participation terminal 2c, and determines whether the contact of the wireless communication network participation terminal 2c has been detected (step S141).

When it is determined that there is an instruction to generate vibration related to the imager 108, the vibration controller 104 controls the vibration generating module 103 such that the vibration generating module 103 generates vibration for dropping an object attached to the filter arranged on the front surface of the imaging element of the imager 108. The vibration generating module 103 generates the vibration for dropping an object attached to the filter arranged on the front surface of the imaging element of the imager 108 in accordance with control by the vibration controller 104 (step S152). After the vibration is generated, the detector 107 monitors contact of the wireless communication network participation terminal 2c, and determines whether the contact of the wireless communication network participation terminal 2c has been detected (step S141). The remaining operations other than the above operation are the same as the operations illustrated in FIG. 18, and thus a description thereof is omitted here. Further, the operation of the wireless communication network participation terminal 2c is the same as the operation illustrated in FIG. 19, and thus a description thereof is omitted here.

A wireless communication network construction terminal having a constitution in which the detector 107 and the imager 108 are added to the constitution of the wireless communication network construction terminal 1b illustrated in FIG. 2 and a wireless communication network participation terminal having a constitution in which the detector 205 is added to the constitution of the wireless communication network participation terminal 2b illustrated in FIG. 4 can perform the operation described in the present embodiment as well. The detailed operation is the same as the above-described operation, and thus a description thereof is omitted here.

According to the present embodiment, the wireless communication network construction terminal 1e and the wireless communication network participation terminal 2c can support a plurality of wireless communication protocols. Further, when the wireless communication network construction terminal 1e is a terminal (a digital still camera, a mobile telephone, a smartphone, a tablet, or the like) including the imager 108, it is possible to generate vibration using an original function of the terminal. Thus, it is possible to prevent an increase in cost.

Fifth Embodiment

Figure 23:
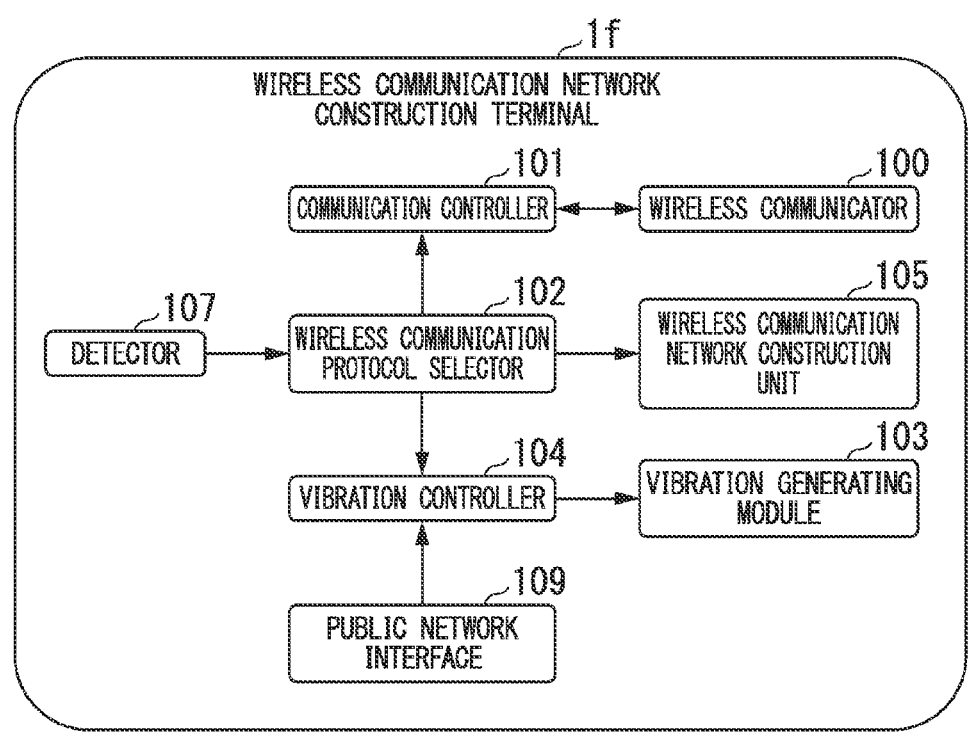
FIG. 23 is a block diagram illustrating the constitution of a wireless communication network construction terminal according to a fifth embodiment of the present invention.

Next, a fifth embodiment of the present invention is described. FIG. 23 illustrates the constitution of a wireless communication network construction terminal according to the present embodiment. In FIG. 23, components having the same functions as the components illustrated in FIG. 16 are denoted by the same reference numerals. A wireless communication network construction terminal 1f illustrated in FIG. 23 has a constitution in which a public network interface 109 is added to the constitution of the wireless communication network construction terminal 1d illustrated in FIG. 16. The public network interface 109 is an interface for a telephone line, and performs voice communication and the like. Further, in the present embodiment, the vibration controller 104 causes the vibration generating module 103 to generate vibration indicating a wireless communication protocol and vibration indicating that a call arrives at the public network interface 109. The constitution of a wireless communication network participation terminal according to the present embodiment is the same as the constitution of the wireless communication network participation terminal 2c illustrated in FIG. 17.

Figure 24:
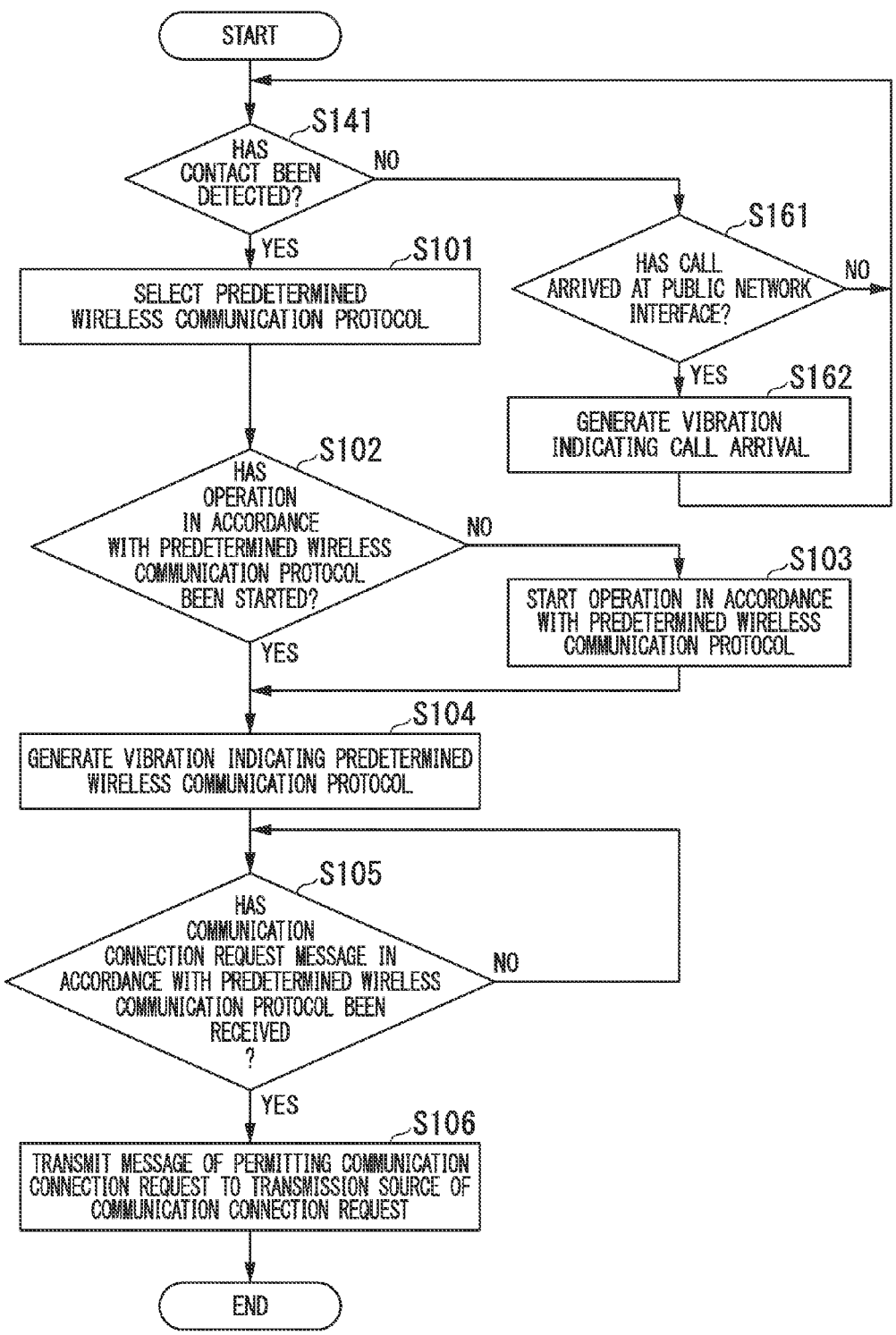
FIG. 24 is a flowchart illustrating an operation procedure of the wireless communication network construction terminal according to the fifth embodiment of the present invention.

FIG. 24 illustrates an operation of the wireless communication network construction terminal 1f. In FIG. 24, the same operations as the operations illustrated in FIG. 18 are denoted by the same step numbers. In FIG. 24, operations of steps S161 and S162 are added to the operations illustrated in FIG. 18.

When it is determined in step S141 that contact has not been detected, the vibration controller 104 monitors communication performed by the public network interface 109, and determines whether a call arrives at the public network interface 109 (step S161). When it is determined that no call arrives at the public network interface 109, the detector 107 monitors contact of the wireless communication network participation terminal 2c, and determines whether the contact of the wireless communication network participation terminal 2c has been detected (step S141).

When it is determined that a call arrives at the public network interface 109, the vibration controller 104 controls the vibration generating module 103 such that the vibration generating module 103 generates vibration indicating call arrival. The vibration generating module 103 generates vibration indicating call arrival in accordance with control by the vibration controller 104 (step S162). After vibration is generated, the detector 107 monitors contact of the wireless communication network participation terminal 2c, and determines whether the contact of the wireless communication network participation terminal 2c has been detected (step S141). The remaining operations other than the above operation are the same as the operations illustrated in FIG. 18, and thus a description thereof is omitted here. Further, the operation of the wireless communication network participation terminal 2c is the same as the operation illustrated in FIG. 19, and thus a description thereof is omitted here.

A wireless communication network construction terminal having a constitution in which the detector 107 and the public network interface 109 are added to the constitution of the wireless communication network construction terminal 1b illustrated in FIG. 2 and a wireless communication network participation terminal having a constitution in which the detector 205 is added to the constitution of the wireless communication network participation terminal 2b illustrated in FIG. 4 can perform the operation described in the present embodiment as well. The detailed operation is the same as the above-described operation, and thus a description thereof is omitted here.

According to the present embodiment, the wireless communication network construction terminal 1f and the wireless communication network participation terminal 2c can support a plurality of wireless communication protocols. Further, when the wireless communication network construction terminal 1f is a terminal (a mobile telephone, a smartphone, or the like) including the public network interface 109, it is possible to generate vibration using an original function of the terminal. Thus, it is possible to prevent an increase in cost.

Hereinabove, while preferred embodiments of the present invention have been described, the present invention is not limited to these embodiments. Additions, omissions, substitutions, and other modifications can be made to the present invention without departing from the spirit and scope of the present invention. The present invention is not limited to the above-mentioned description, and is only limited by the scope of the appended claims.

What is claimed is:

1. A wireless communication network construction terminal, comprising:
   a vibration generating module configured to generate vibration;
   a wireless communicator;
   a construction unit configured to construct a wireless communication network;
   a selector configured to select one of a plurality of wireless communication protocols;
   a vibration controller configured to cause the vibration generating module to generate vibration indicating a wireless communication protocol selected by the selector; and
   a communication controller configured to start an operation in accordance with the wireless communication protocol selected by the selector when the operation has not been started, and, when a communication connection request message corresponding to the wireless communication protocol selected by the selector is wirelessly received by the wireless communicator after the operation is started, to cause the wireless communicator to wirelessly transmit a message of permitting a communication connection request to a wireless communication network participation terminal that has wirelessly transmitted the communication connection request message.

2. The wireless communication network construction terminal according to claim 1, further comprising a detector configured to detect contact of an external object,
   wherein the vibration controller is configured to cause the vibration generating module to generate the vibration indicating the wireless communication protocol selected by the selector when the detector detects the contact.

3. The wireless communication network construction terminal according to claim 2, further comprising an imager,
   wherein the vibration controller is configured to cause the vibration generating module to generate vibration for dropping an object attached to the imager when the detector has not detected the contact.

4. The wireless communication network construction terminal according to claim 2, further comprising a public network interface,
   wherein the vibration controller is configured to cause the vibration generating module to generate vibration indicating that a call arrives at the public network interface when the detector has not detected the contact and a call arrives at the public network interface.

5. The wireless communication network construction terminal according to claim 1, wherein the selector is configured to select a wireless communication protocol different from a previously selected wireless communication protocol when the communication connection request message is not wirelessly received within a predetermined period of time after the vibration generating module generates vibration.

6. The wireless communication network construction terminal according to claim 1, wherein the vibration controller is configured to cause the vibration generating module to generate vibration indicating the same wireless communication protocol as a wireless communication protocol indicated by previously generated vibration when the communication connection request message is not wirelessly received within a predetermined period of time after the vibration generating module generates vibration.

7. The wireless communication network construction terminal according to claim 1, further comprising a storage unit that stores setting information of the wireless communication network,
   wherein the vibration controller is configured to cause the vibration generating module to generate the vibration indicating the wireless communication protocol selected by the selector and vibration corresponding to the setting information stored in the storage unit.

8. A wireless communication network participation terminal, comprising:
   a vibration detector configured to detect vibration;
   a wireless communicator;
   an information extractor configured to extract information indicating a predetermined wireless communication protocol from vibration detected by the vibration detector; and
   a communication controller configured to start an operation in accordance with the wireless communication protocol indicated by the information extracted by the information extractor, and to cause the wireless communicator to wirelessly transmit a communication connection request message to a wireless communication network construction terminal in accordance with the wireless communication protocol indicated by the information extracted by the information extractor after the operation is started.

9. The wireless communication network participation terminal according to claim 8, further comprising a detector configured to detect contact of an external object, wherein the information extractor is configured to extract the information indicating the predetermined wireless communication protocol from the vibration detected by the vibration detector when the detector detects the contact.

10. The wireless communication network participation terminal according to claim 8, further comprising a detector configured to detect contact of an external object, wherein the information extractor is configured to extract the information indicating the predetermined wireless communication protocol and information indicating setting information of a wireless communication network from the vibration detected by the vibration detector when the detector detects the contact.

11. The wireless communication network participation terminal according to claim 8, wherein the vibration detector includes a motion sensor.

12. A wireless communication system, comprising:

a wireless communication network construction terminal; and a wireless communication network participation terminal, wherein the wireless communication network construction terminal includes:

a vibration generating module configured to generate vibration;

a first wireless communicator;

a construction unit configured to construct a wireless communication network;

a selector configured to select one of a plurality of wireless communication protocols;

a vibration controller configured to cause the vibration generating module to generate vibration indicating a wireless communication protocol selected by the selector; and a first communication controller configured to start a first operation in accordance with the wireless communication protocol selected by the selector when the first operation has not been started, and, when a communication connection request message corresponding to the wireless communication protocol selected by the selector is wirelessly received by the first wireless communicator after the first operation is started, to cause the first wireless communicator to wirelessly transmit a message of permitting a communication connection request to the wireless communication network participation terminal that has wirelessly transmitted the communication connection request message, and the wireless communication network participation terminal includes:

a vibration detector configured to detect vibration;

a second wireless communicator;

an information extractor configured to extract information indicating a wireless communication protocol from vibration detected by the vibration detector; and a second communication controller configured to start a second operation in accordance with the wireless communication protocol indicated by the information extracted by the information extractor, and to cause the second wireless communicator to wirelessly transmit the communication connection request message to the wireless communication network construction terminal in accordance with the wireless communication protocol indicated by the information extracted by the information extractor after the second operation is started.

13. A wireless communication method, comprising:

a constructing step of constructing, by a wireless communication network construction terminal, a wireless communication network;

a selecting step of selecting, by the wireless communication network construction terminal, one of a plurality of wireless communication protocols;

a vibration generating step of generating, by the wireless communication network construction terminal, vibration indicating a wireless communication protocol selected in the selecting step;

a first starting step of starting, by the wireless communication network construction terminal, a first operation in accordance with the wireless communication protocol selected in the selecting step when the first operation has not been started;

a vibration detecting step of detecting, by a wireless communication network participation terminal, the vibration;

an information extracting step of extracting, by the wireless communication network participation terminal, information indicating a wireless communication protocol from the vibration detected in the vibration detecting step;

a second starting step of starting, by the wireless communication network participation terminal, a second operation in accordance with the wireless communication protocol indicated by the information extracted in the information extracting step;

a first transmitting step of wirelessly transmitting, by the wireless communication network participation terminal, a communication connection request message to the wireless communication network construction terminal in accordance with the wireless communication protocol indicated by the information extracted in the information extracting step after the second operation is started; and a second transmitting step of wirelessly transmitting, by the wireless communication network construction terminal, a message of permitting a communication connection request to the wireless communication network participation terminal that has wirelessly transmitted the communication connection request message when the communication connection request message corresponding to the wireless communication protocol selected in the selecting step is wirelessly received after the first operation is started.

14. A computer readable recording device having a program stored thereon for causing a computer to execute a method, the method comprising:

a constructing step of constructing a wireless communication network;

a selecting step of selecting one of a plurality of wireless communication protocols;

a vibration generating step of causing a vibration generating module to generate vibration indicating a wireless communication protocol selected in the selecting step;

a step of starting an operation in accordance with the wireless communication protocol selected in the selecting step when the operation has not been started; and a transmitting step of causing a wireless communicator to wirelessly transmit a message of permitting a communication connection request to a wireless communication network participation terminal that has wirelessly transmitted a communication connection request message corresponding to the wireless communication protocol selected in the selecting step when the communication connection request message is wirelessly received by the wireless communicator after the operation is started.

15. A computer readable recording device having a program stored thereon for causing a computer to execute a method, the method comprising:
- a vibration detecting step of causing a vibration detector to detect vibration;
- an information extracting step of extracting information indicating a predetermined wireless communication protocol from vibration detected in the vibration detecting step;
- a step of starting an operation in accordance with the wireless communication protocol indicated by the information extracted in the information extracting step; and
- a transmitting step of causing a wireless communicator to wirelessly transmit a communication connection request message to a wireless communication network construction terminal in accordance with the wireless communication protocol indicated by the information extracted in the information extracting step after the operation is started.

* * * * *